(12) United States Patent
Wright

(10) Patent No.: US 9,908,067 B2
(45) Date of Patent: Mar. 6, 2018

(54) FLOATABLES AND SCUM REMOVAL APPARATUS FOR A WASTE WATER TREATMENT SYSTEM

(71) Applicant: ClearCove Systems, Inc., Rochester, NY (US)

(72) Inventor: Terry Wright, Rochester, NY (US)

(73) Assignee: ClearCove Systems, Inc., Rochester, NY (US)

( * ) Notice: Subject to any disclaimer, the term of this patent is extended or adjusted under 35 U.S.C. 154(b) by 478 days.

(21) Appl. No.: 14/142,099

(22) Filed: Dec. 27, 2013

(65) Prior Publication Data
US 2015/0182881 A1    Jul. 2, 2015

(51) Int. Cl.
*B01D 21/00*    (2006.01)
*B01D 21/24*    (2006.01)
*C02F 1/00*    (2006.01)

(52) U.S. Cl.
CPC ..... *B01D 21/0012* (2013.01); *B01D 21/0006* (2013.01); *B01D 21/2427* (2013.01);
(Continued)

(58) Field of Classification Search
CPC ............ B01D 21/0006; B01D 21/0012; B01D 21/2427; B01D 21/2433; B01D 21/2444; B01D 29/445; B03D 1/1462; C02F 2001/007; C02F 2303/24; E03F 5/16; Y10T 137/8807
See application file for complete search history.

(56) References Cited

U.S. PATENT DOCUMENTS 2,401,745 A * 6/1946 Brown ................. B03D 1/1462
                                                            209/170
2,799,396 A   7/1957 Belaskas
(Continued)

FOREIGN PATENT DOCUMENTS

EP    0010395 A1    4/1980
EP    0421265 A1    4/1991
(Continued)

OTHER PUBLICATIONS

Dango & Dienenthal Plate Filter Brochure, 2011, 6 pages.*
(Continued)

*Primary Examiner* — Patrick Orme
(74) *Attorney, Agent, or Firm* — Harris Beach PLLC; Neal L. Slifkin

(57) ABSTRACT

A waste water treatment system including primary settling tanks. The waste water treatment system includes a trough which causes waste water to flow in a direction parallel to a bar screen placed in the trough with the base of the bar screen being at a lower elevation than the trough weir. Each primary settling tank has a fine screen box for screening waste water. Each primary settling tank has a scum and floatables trough for collecting scum and floatables which pass through or over a top edge of the bar screen. The scum and floatables troughs are in fluid communication with one another. When a scum valve is open, scum, floatables and waste water in the scum and floatables trough flow from the scum and floatables trough of the first primary setting tank to the scum and floatables trough of the second primary settling tank and into a collection container.

14 Claims, 25 Drawing Sheets

(52) U.S. Cl.
CPC ..... *B01D 21/2433* (2013.01); *B01D 21/2444* (2013.01); *C02F 2001/007* (2013.01)

(56) References Cited

U.S. PATENT DOCUMENTS

| | | | |
|---|---|---|---|
| 3,006,474 | A | 10/1961 | Elliott |
| 3,372,715 | A | 10/1963 | Ashton |
| 3,717,257 | A | 2/1973 | Boyle |
| 3,957,655 | A | 5/1976 | Barefoot |
| 3,964,512 | A | 6/1976 | Dumas |
| 3,997,198 | A | 12/1976 | Linder |
| 4,009,106 | A | 2/1977 | Smith |
| 4,192,746 | A | 3/1980 | Arvanitakis |
| 4,202,372 | A | 5/1980 | Gibbons |
| 4,226,714 | A | 10/1980 | Furness |
| 4,367,145 | A | 1/1983 | Simpson |
| 4,405,458 | A | 9/1983 | McHugh, Jr. |
| 4,474,213 | A | 10/1984 | Jameson |
| 4,608,165 | A | 8/1986 | Galper |
| 4,715,570 | A | 12/1987 | Mashuda |
| 4,722,800 | A * | 2/1988 | Aymong ............ B01D 17/0208 210/170.01 |
| 5,021,153 | A | 6/1991 | Haws |
| 5,205,768 | A | 4/1993 | Pollack |
| 5,290,434 | A | 3/1994 | Richard |
| 5,352,356 | A | 10/1994 | Murphy |
| 5,503,747 | A | 4/1996 | Vion et al. |
| 5,951,878 | A | 9/1999 | Astrom |
| 6,213,555 | B1 | 4/2001 | La Terra |
| 7,025,888 | B2 | 4/2006 | Thompson |
| 7,686,996 | B2 | 3/2010 | Strobel et al. |
| 7,824,549 | B2 | 11/2010 | Wilcher et al. |
| 7,972,505 | B2 | 7/2011 | Wright |
| 8,225,942 | B2 | 7/2012 | Wright |
| 8,398,864 | B2 | 3/2013 | Wright |
| 8,721,889 | B2 | 5/2014 | Conner et al. |
| 8,875,371 | B2 | 11/2014 | Patten et al. |
| 2003/0164341 | A1 | 9/2003 | Use et al. |
| 2007/0095749 | A1 * | 5/2007 | Komatsu ............ B01D 17/00 210/513 |
| 2007/0151916 | A1 | 7/2007 | Knappe et al. |
| 2009/0095672 | A1 | 4/2009 | Wilcher et al. |
| 2010/0018929 | A1 * | 1/2010 | Wright ............ B01D 21/0006 210/739 |
| 2010/0176054 | A1 | 7/2010 | Koopmans |
| 2010/0236999 | A1 * | 9/2010 | Utsunomiya ......... B01D 21/04 210/199 |
| 2011/0278212 | A1 | 11/2011 | Tyner et al. |
| 2012/0261337 | A1 | 10/2012 | Weiss |

FOREIGN PATENT DOCUMENTS

| | | |
|---|---|---|
| EP | 1700963 A1 | 9/2006 |
| EP | 2889067 A1 | 7/2015 |
| GB | 1079809 A | 8/1967 |
| JP | 03065298 A | 3/1991 |
| JP | 2002 001310 A | 1/2002 |

OTHER PUBLICATIONS

Communication: Extended EP Search Report for EP 14200235, dated Jan. 1, 2016, 17 Pages.

Communication: Partial EP Search Report for EP 15175703, dated Jul. 1, 2016, 10 Pages.

Communication: Partial European Search Report, dated Aug. 31, 2015.

"Vortex Grit Chamber KD 01.5", Dec. 17, 2013 (Dec. 17, 2013), X P055236807 Retrieved from the Internet: URL: http://www.dwe.dk/files/files/produkter/KD01-5_bro_GB.pdf [retrieved on Dec. 16, 2015] p. 2; figure 1, 2.

"Vortex Grit Chamber KD 01.5", Dec. 17, 2013 (Dec. 17, 2013), X P055236807 Retrieved from the Internet: URL: http://www.dwe.dk/files/files/produkter/KD01-5_bro_GB.pdf [retrieved on Dec. 16, 2015] *page 2; figure 1, 2.

Communication Pursant to Rule 62 EPC, dated May 4, 2016, enclosing extended European Search Report (15 pages), which provides an explanation as to the relevance of foreign references and non-patent literature cited in this Information Disclosure Statement.

* cited by examiner

FLOATABLES AND SCUM REMOVAL APPARATUS FOR A WASTE WATER TREATMENT SYSTEM

FIELD OF THE INVENTION

The present invention relates to a floatables and scum removal apparatus for use with a waste water treatment system. More particularly, the present invention relates to improvements in floatables and scum removal which allow removal of these items at the entrance to the water treatment system.

BACKGROUND OF THE INVENTION

Waste water treatment systems used in the industry generally include, but are not limited to, the following treatment processes: grit removal, fine screening, flow equalization and primary clarification. The typical treatment processes are dependent on the velocity at which the waste water is moving through the system. Waste water, however, is not produced continually by humans, but instead is created in batch type processes, such as showering, flushing a toilet or operating a washing machine. Such water consumptive activities are generally repetitive resulting in daily, weekly, monthly and yearly diurnal flow patterns for a specific waste water treatment system. Accordingly, the volume of waste water produced, and the velocity of that waste water through the treatment system varies significantly throughout the day.

In the prior art, grit removal is generally performed in a grit chamber which is velocity sensitive. The most common methods to remove grit are by reducing the velocity of the influent flow so that the grit settles out, or utilizing a circular channel/tank. The circular channel/tank is a hydro-cyclone that causes the grit to settle in a sump, separating the organics from the grit so that they can move forward to the biological processes. The grit is then pumped out of the sump to a grit washer and then discharged to a dumpster for disposal at a landfill.

Fine screening is typically accomplished by placing a screen in an influent channel. The influent channel must have a minimum velocity of 1.25 feet per second to keep solids from settling out in the channel and a maximum velocity of 3.0 feet per second to keep solids from being forced through the screen. Such a flow is difficult to achieve due to the large variation in diurnal and pumped flow patterns.

Typical primary clarifiers are also velocity sensitive with the heavy solids going to the base of the clarifier where they are pumped to a digester, the floatable solids, grease and scum are trapped and skimmed off the surface and the neutral buoyant solids/clarified waste water exits the basin via an effluent weir. Primary clarifiers are typically large tanks designed for gravity settling and may include electrical drives, flights and chains, rack arms and paddles or suction tubes and sludge pumps.

Flow equalization typically occurs in a separate tank. The flow at the waste water plant is subject to travel times in the collection system, collection system design and pump station sizing. In general, larger collection systems use pump stations to lift the waste water to the treatment facility. The pumps are typically placed on variable-frequency drives in an attempt to provide a consistent uniform flow. The system of variable-frequency drives and pumps, however, fails in low and high flow conditions. The pumps must be designed for peak hourly flows and have minimal turn down capabilities.

Traditionally, waste water treatment plants have static bar racks or mechanically cleaned bar screens in channels at the entrance of the waste water into the treatment facility. These influent channels are typically constructed of concrete so as to last the life of the facility and are designed for specific waste water volumes, velocities (1 to 3 feet per second), and the insertion of specific screening and grit removal equipment.

The social behavior of flushing solids that should go to landfill such as baby wipes, diapers, swizzle sticks, condoms, tampon applicators, etc. creates issues for the operation of the waste water treatment facility. Many of these solids are neutrally buoyant or will float in the waste water. Elongated solids align with the flow and pass or are forced through the bar racks or mechanical screens because of the high flow. The flat sheet solids such as diapers and baby wipes cover the bar racks or screens causing the liquid level in the channel to rise and enter a bypass channel. These solids often end up creating issues in the treatment plant such as fouling pumps, valves, diffusers, and membranes ultimately ending up in the digester or sludge holding tank.

The increase in frequency and intensity of storm events producing exceptional precipitation combined with leaky sewage collection systems produces greater volumes of waste water delivered to the waste water treatment plant. Changes in societal behavior are not likely to occur. The cost to repair or replace the aged collection systems of developed nations is not fiscally achievable in the time frame needed. Therefore, the limited cross-sectional area of a channel requires an innovative approach to solve the above issues. The solution must be efficient in consideration of the goal to convert energy consumptive waste water treatment plants to sustainable resource recovery facilities where possible.

To accomplish the above, the influent channels must be replaced with tanks. Waste water design engineers and manufacturers of screening equipment recognize that high velocities and screening are in conflict. Yet the use of channels at the head of the waste water treatment process is still taught to engineering students today.

BRIEF SUMMARY OF THE INVENTION

Recently, a single tank waste water treatment system was developed which eliminates many problems associated with the prior art designs. The system comprises a single primary settling tank that performs grit removal, flow equalization, primary clarification and fine screening. This waste water treatment system is described in U.S. Pat. No. 7,972,505, the disclosure of which is incorporated by reference herein.

The invention is suitable for use with industrial and municipal waste water treatment. It is also useful for clarifiers, settling tanks or biological processes such as sequencing batch reactors that have changes in liquid elevations in these tanks and for industrial process waste waters containing high or low specific gravity constituents. The present invention increases the surface area of the screen in contact with the liquid by placing the screens in a tank having an influent feed trough, not a channel, to further reduce the velocity of the liquid at the screen interface. The influent feed trough also changes the flow direction at the screen face to prevent elongated items from aligning with the flow. Elongated items align with the flow and pass through the screens). High velocities will push the larger pliable solids through the screen openings. The present invention operates at a reduced water velocity, trapping all solids larger than the screen openings between the tank wall and the screen face. The trapped floatables rise with the liquid in the tank to the top of the screen where a scum trough is in close proximity to the screen. The scum trough is valved to control the liquid flow exiting the tank from the surface. A control system allows the operator to manually open the valve or set the number of tank fill cycles between scum withdrawals. When the liquid is above the trough and the valve is opened, the surface liquid moves towards the trough and then exits the tank. The liquid movement towards the trough moves the scum and floatables to the trough. The liquid transporting the scum and floatables out of the tank discharges into the collection box with an integral basket of fine mesh. A disposable bag may line the interior of the basket. Also, polymers, adsorbents or absorbents may be added to the interior of the disposable bag to capture hydrocarbons or other constituents specific to the waste water being treated. The operator manually disposes of the bag when it is full. The collection box, basket, and bags are volumetrically sized to handle the volume of solids and scum from multiple cycles which allows the captured constituents to be washed with the liquid transporting the scum and floatables. The liquid passing through the scum basket and/or bag returns to the adjacent tank or may be directed to another process for further treatment.

In the traditional treatment of waste water, tanks are used for flow equalization, clarification, aeration and storage of liquids and or solids. Channels are used as pipes to convey liquids laden with solids from one point to another for treatment. Channels are sized to maintain a velocity of 1 to 3 feet per second to keep solids in suspension. This high velocity pushes solids into and often times through the screen openings. This requires the use of high pressure water, mechanical rakes or scrapers, or brushes to physically remove the solids from the screen openings. It prevents the use of ultrafine screens as the headloss is high and would require a deeper channel upstream of the screen. These ultrafine screens are needed for new waste water process technologies like membranes. It also prevents dietary fibers or soluble biological oxygen demand (SBOD) constituents from settling. The SBOD requires energy to convert to biomass and $CO_2$, which biomass, if settled, could be used to generate biogas to power micro-turbines to generate electricity or cleaned to produce compressed natural gas or propane. The dietary fibers cause fouling of hollow fiber membranes, the larger solids plug the flat plate membranes resulting in high energy to scour the membranes. The fouling or plugging of the membranes reduces their life cycle thus increasing operational issues and replacement costs. Unexpected flows from aged collection systems and increased storm intensities cause these traditional systems to cease to function properly. By using tanks instead of channels there is more screen surface area in contact with the waste water liquid so the velocity at the screen/liquid interface is much lower. Tanks can be wider and deeper than channels so the cross-sectional area of the liquid is much larger and the forward velocity is significantly less. The slower the forward (and rise) velocities, the greater the surface and cross-sectional areas the greater the ability for dense solids, like grit, to settle and for the light solids and liquids to float. This reduces the solids coming in contact with the screen. It allows for screens having smaller openings to be used with less headloss and cleaning required. Static screens may be used as the solids are not being forced into and lodging in the openings. It allows for higher than expected future flows to be handled effectively as there is more screen surface area.

The invention provides a modular scum and floatables capture system for the retention and directional movement of soluble and solid constituents having a specific gravity of less than 1.0, floatables screenings, removal of retained floatables and scum, and washing of floatables found in waste water (combined sewers, sanitary sewer, petroleum spills, and industrial process waters). The system is installed in a tank or tanks that have liquid elevations that vary between a high and a low liquid level and have an inlet trough or weir. Scum and floatable content may consist of fats, oils, grease, liquid and solids having a specific gravity less than 1.0 such as petroleum products and solids having trapped air to cause objects with a specific gravity greater than 1.0 to float.

The system consists of stationary or mechanical bar screens, rotational scum troughs, control system to operate actuated valves in manual or automatic modes, actuated valves and slide gates, collection boxes placed inside or outside the tank with each having a removable capture basket that may or may not have a disposable liner bag or just a disposable bag without a basket. An adsorbent may be placed in the disposable bags to capture specific constituents in the waste water such as petroleum products that would separate during the clarification process and rise to the surface of the liquid.

Stationary or mechanical screens are placed between the interior edge of an influent weir or trough and the tank wall with the waste water entering between the screen and tank wall. The screen may be perpendicular to the liquid surface or vertically inclined and rise to a close proximity (e.g., less than 0.5 inches) of the scum trough at the high liquid level in the tank. The screen can be the same dimension or shorter than the horizontal dimension of the scum trough. The screen is set back from the edge of the weir to increase the screen surface area in contact with the liquid (as the weir slopes downward at a 70 degree angle towards the wall) and not to create a disturbance of the liquid at the edge of the weir causing the velocities to be higher and uneven, which might result in a break in cohesion or surface tension to the surface of the weir. Elongated objects will align with the flow so when the liquid turns 90 degrees to enter the tank the largest dimension (long dimension) of the solid is perpendicular to the screen. Both the low velocity and causing the elongated side of the solid to be parallel to the screen prevents solids from being wedged into the open spaces of the screen. This leaves the solids free to move vertically with the liquid level of the tank.

The collection box may be located inside or outside of the tank depending on the application. If the floating and separated soluble constituents in the surface water are to be adsorbed or reused then the collection box will likely be located outside of the tank so the liquid does not continue to move back and forth between the adjacent tanks creating a concentration loop. The low specific gravity liquids and water will be properly directed to further treatment processes. If there is no adsorption or reuse of the liquid constituents the collection box will likely be placed inside the tank, above the grit box, so the liquid freely falls down into the grit box. The exterior walls of the grit box are closed and sealed, and rise to an elevation above the highest liquid level in the tank. Should some floatable solids fall from the basket they remain trapped between the screen and tank wall. The liquid falling into the grit box will then travel into the feed trough and over the weir into the tank. This is efficient because the tank receiving the conveyed liquid along with the floatable solids and scum has a low liquid level and will enter into a fill cycle when the scum cycle in the adjacent tank ends. Current scum cycles require significant amount of transport liquid to move the solids via pumps and piping to the next process. Often the next process occurs in a sludge holding tank or digester followed by a belt press. This surplus liquid from conveying the floatables is then decanted from the surface of the scum holding tank or digester and pumped back to the head of the waste water treatment plant for reprocessing. This increases capital costs, energy consumption, and operation and maintenance costs to keep pipes and pumps free of these solids and FOG (Fats, Oils, Grease).

When a scum cycle takes place the liquid is at the high level or slightly higher than the scum trough weir the actuated valves open. The scum troughs between adjacent rectangular tanks are common. There are two types of operations possible. In one, the collection box is located inside the tank—one tank has a high liquid level (tank A) and the other tank (tank B) has a low liquid level. A valve at the common wall dividing the adjacent tanks is normally closed until a scum cycle is manually or automatically initiated. When this valve is opened, the liquid in and above the scum trough in tank A moves through the connected scum troughs carrying the scum and floatables to the scum basket or bag located in the collection box of tank B. The scum and floatables are captured in the basket or bag and the liquid returns to the grit chamber and influent feed system of tank B. In the other, the collection box is located outside the tank—one tank has a high liquid level (tank A) and the other tank (tank B) has a low liquid level. A valve at the common wall dividing the adjacent tanks is normally closed until a scum cycle is manually or automatically initiated. When this valve is opened, the liquid in and above the scum trough in tank A moves through the connected scum troughs carrying the scum and floatables to the scum basket or bag located in the collection box located outside of tank B. The scum and floatables are captured in the basket or bag and the liquid is directed to another process. This option is used when the clarified liquid at the surface is to be reused or processed further such as cleanup of fuel spills.

The system can also be used with two circular tanks adjacent to each other. Each tank can have an internal circular bar screen that extends to the same elevation as the outside wall of the scum trough. The scum trough is circular, located at the top of the tank, has an outer wall higher than the tank wall, the tank wall serves as the inside wall of the scum trough and the bottom of the trough is lower than the top of the tank. Each scum trough has a collection box with a basket or bag located inside to capture the floatables, there is a drain pipe at the bottom of the box that slopes downward and connects to the adjacent circular tank. There is a weighted flap valve at the inlet to the adjacent tank. One tank has a high liquid level (tank A) and the other tank (tank B) has a low liquid level. When tank A is selected to undergo a scum cycle the influent pump continues to add liquid to tank A raising the liquid above the tank wall so the floatables and scum flow over the tank wall and into the trough. The liquid carries the scum and floatables to the opening in the bottom of the trough, falls through the basket onto the bottom of the collection box, down the drain pipe to tank B. The process is the same for a tank B scum cycle.

The solid scum and floatables are captured in the basket and/or bag as the liquid passes through the basket or bag and returns to the adjacent tank having a low liquid level or to the influent pump station and returned to the tank once again free of scum and floatables or to another treatment process. The basket and or bag are sized for the projected volume of floatables collected over multiple scum cycles. This allows the captured floatables to be washed multiple times with each cycle.

The rotational scum trough is a pipe cut lengthwise thus forming 2 weirs. A rotational scum trough rests at each end and has a rod running vertically. When the rod is at the 12:00 o'clock position both weirs are at the same elevation. If the rod is rotated to the 11:00 o'clock position then the weir on the left lowers and the weir on the right rises. If the rod is moved to the 1:00 o'clock position, the liquid enters the scum trough from the low side. Typically the rod will be tilted towards the bar screen to pull the trapped floatables and scum into the scum trough.

Periodically the operator will need to draw off the scum that passes through the screen into the main body of the tank on the opposite side of the screen.

The invention also includes a bar screen backwash and influent feed trough scour cycle. An actuated slide gate is positioned on an opening in the common dividing wall as close to the high point of the sloped bottom of the influent feed trough. The actuated slide gate controls flow from the full tank to the low liquid level tank. Over time solids are expected to settle in the feed trough and fibers to staple to the bar screen. To address this issue the following operation takes place. On completion of a scum cycle in tank A the grit valve in tank B opens. The solid-laden liquid in the influent feed trough drains to the grit box and exits tank B to another treatment process. At a user-defined time frame or upon visual (manual) activation, the actuated slide gate opens and liquid exits tank A to tank B, scouring the influent trough of tank B and carrying solids and liquid to the grit box, and then exits the system. The liquid in tank A flows from the decanter side of the bar screen towards the influent feed system. This reversal of normal flow will dislodge many of the solids and fibers attached to the bar screen as the influent velocity through the bar screen is very low so the solids are not wedged into the screen. This action will minimize the need to physically clean the bar screen. The slide gate will open for a short period of time and only one bar screen will be backwashed at a time to minimize the volume of liquid exiting via the grit box drain.

In summary, the invention provides a waste water treatment system including at least two primary settling tanks wherein processes of grit removal, sludge removal, primary clarification, and fine screening are carried out. The settling tanks have a waste water level which changes over time between a high level near the top of the primary settling tanks and a low level near the bottom of the primary settling tanks. The waste water treatment system includes an influent feed basin and an influent feed trough which cause water to flow in a direction parallel to the bar screen. Each primary settling tank has a fine screen box which moves in a vertical direction, between a low level near the bottom of the primary settling tank and a high level wherein the screen box is above the high level of the waste water at the start of the scum or decant cycles. The fine screen boxes include a water outlet for removal of screened waste water from within the fine screen boxes. The fine screen boxes have fine screen material with openings of a first size. Each primary settling tank has a bar screen with screen openings of a second size larger than the openings of the first size. The bar screen is located in an influent feed trough with a base of the bar screen lower than a weir in the feed trough. This reduces the velocity through the bar screen when the liquid level in the tank is below the influent feed trough weir. The slope of the influent feed trough allows for additional screen surface area. By moving the bar screen away from the weir, the deeper the bar screen goes thus increasing the area of the surface/liquid interface. Another aspect of moving the bar screen back from the weir edge is it improves laminar flow over the weir. If the bars were placed at the weir edge turbulence at the weir edge would be created thus affecting the surface tension and cohesion of the liquid to the exterior face of the trough. Each primary settling tank has a water inlet for introducing waste water to the primary settling tank. The waste water contains scum and floatables. Each primary settling tank has a water inlet area separated from a portion of the primary settling tank by the bar screen. Each primary settling tank has a scum and floatables trough on a side of the bar screen opposite the water inlet for collecting scum and floatables which passes over a top edge of the bar screen. The scum and floatables trough can be rotatably mounted such that it can rotate about its longitudinal axis. The scum and floatables trough of a first primary settling tank, and of a second primary settling tank are in fluid communication with one another and are separated by a scum valve. When the scum valve is open, scum, floatables and water in the scum and floatables trough flow from the scum and floatables trough of the first primary setting tank to the scum and floatables trough of the second primary settling tank. Each scum and floatables trough has a collection container for collecting the scum and floatables that flows through the scum and floatables trough. The collection container could be in the form of a basket or a bag which retains the floatables and allows the water to pass through the basket or bag. The basket or bag is removable such that it may be removed and emptied by an operator of the system. The primary settling tank includes an influent feed basin such that the velocity of the water flowing through the bar screen is decreased. The waste water treatment system includes a weir such that water flowing over the weir flows in a generally laminar flow down the exterior surface of the weir reducing air entrainment that may cause the sludge to float.

The waste water treatment system includes a backwash valve on the same side of the bar screen as the water inlet such that when the water inlet is closed and the backwash valve is open, water flows from the primary settling tank through the bar screen and through the backwash valve so that water and debris caught in the bar screen on the full tank are backwashed from the bar screen.

BRIEF DESCRIPTION OF THE SEVERAL VIEWS OF THE DRAWINGS

The foregoing and other objects, features, and advantages of the invention will be apparent from the following drawings and more particular description of the preferred embodiments of the invention.

DETAILED DESCRIPTION OF THE INVENTION

Throughout the following description, specific details are set forth in order to provide a more thorough understanding of the invention. However, the invention may be practiced without these particulars. In other instances, well known elements have not been shown or described in detail to avoid unnecessarily obscuring the disclosure. Accordingly, the specification and drawings are to be regarded as illustrative rather than restrictive. It is to be further noted that the drawings are not to scale.

FIGS. 1 through 25 illustrate embodiments of the invention. The present invention is a system for the primary treatment of waste water 80 (waste water 80 shown in FIGS. 6-23).

Figure 1:
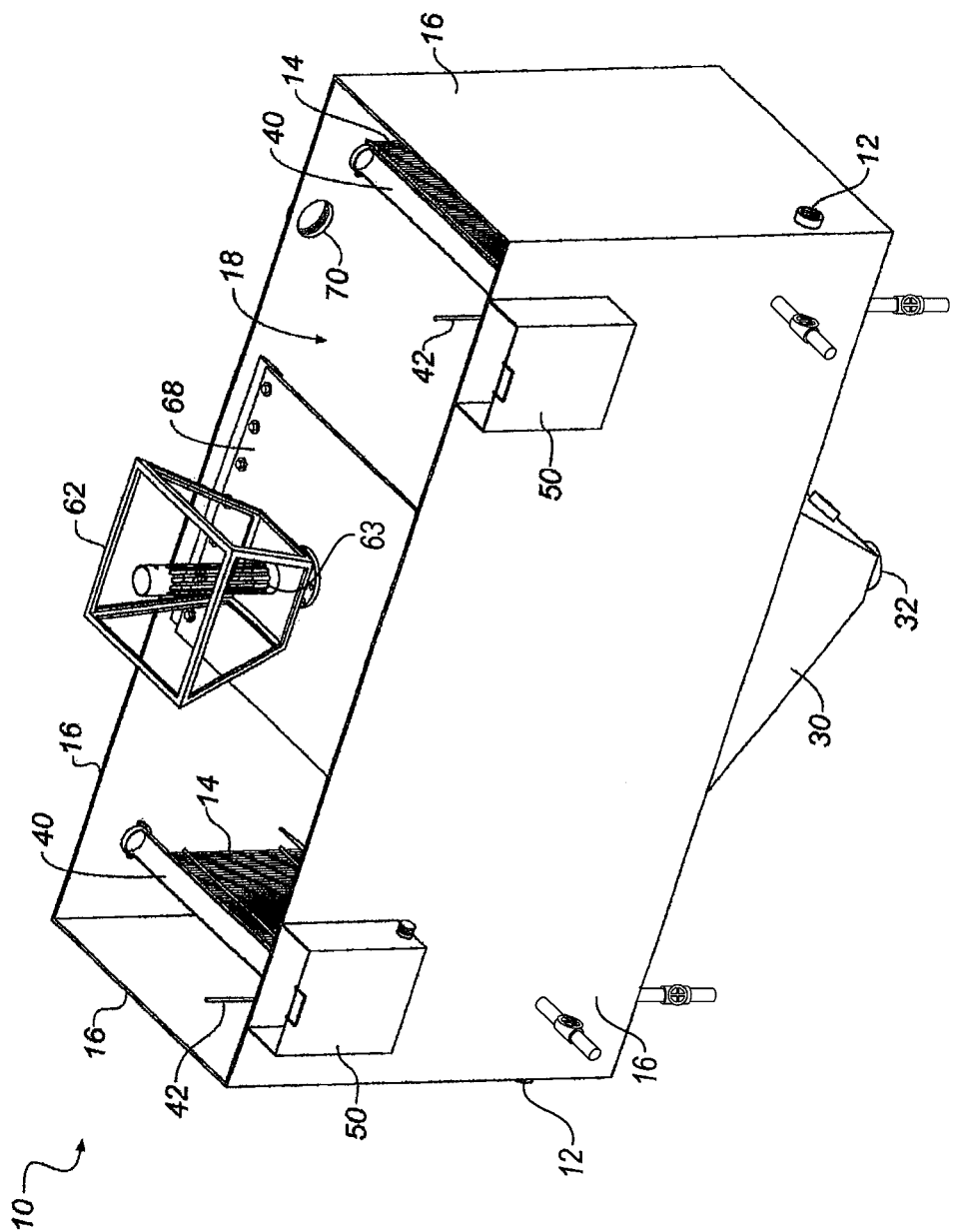
FIG. 1 is a first perspective view of an embodiment of the present invention.
Figure 2:
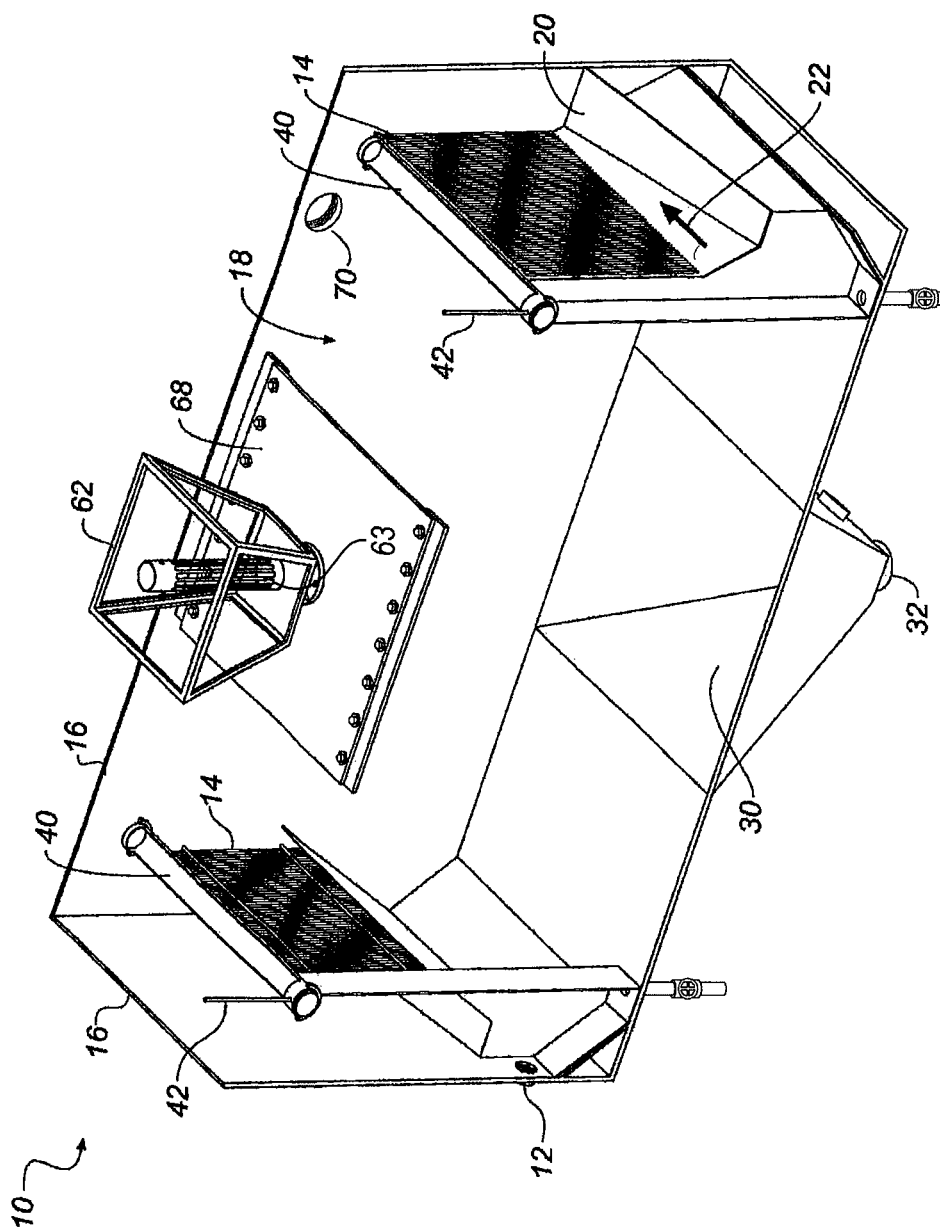
FIG. 2 is a partial-cutaway perspective view of the embodiment shown in FIG. 1.

FIGS. 1 and 2 show a first primary settling tank 10 which receives waste water 80 from a waste water collection system through a first influent pipe 12. The waste water treatment system may also be used in other applications that benefit from an equalized flow into the waste water treatment processes, such as industrial batch discharges, storm water, and septic receiving at a waste water treatment plant. Waste water 80 reaches the waste water treatment system as a result of gravity, the operation of pumps, or both. The first primary settling tank 10 has outer walls 16. A first bar screen 14 is placed in the first primary settling tank 10 between the outer wall 16 and the interior 18 of the first primary settling tank 10. The first bar screen 14 keeps large inorganic solids from entering the waste water treatment system.

The first primary settling tank 10 is sized based on the daily flow patterns for the collection system using generally known engineering practices. The size of the first primary settling tank 10 is large compared to the first influent pipe 12 such that the velocity of the incoming flow decreases dramatically upon entrance of the waste water 80 into the first primary settling tank 10. The first stage of reducing the incoming velocity is to split the flow so there are two first influent pipes 12.

FIG. 2 shows the first primary settling tank 10 with portions cut away to illustrate the interior features. An influent feed trough 20 receives the incoming waste water 80 and directs the flow in the direction of arrow 22. As the waste water 80 level rises to the level of the first bar screen 14, scum and sludge (not shown) pass through the first bar screen 14. Floatables 102 (See FIGS. 9-19) (note that floatables 102 are also referred to herein throughout as scum and floatables 102), such as plastic solids are prevented from passing through the first bar screen 14. Referring to FIGS. 1 and 2, sludge collects in the first sludge hopper 30, and can be removed from the first sludge hopper 30 through first outlet 32. A first scum and floatables trough 40 is provided to collect scum and floatables 102, as will be described in greater detail below. A first handle 42 is connected to the first scum and floatables trough 40 to control the angular position of the first scum and floatables trough 40. A first scum and floatables collection box 50 is in fluid communication with the first scum and floatables trough 40. In FIG. 1, the first scum and floatables collection box 50 is shown on the outside of the first primary settling tank 10 but in other embodiments the first scum and floatables collection box 50 is inside the first primary settling tank 10, as shown in FIG. 3.

Figure 3:
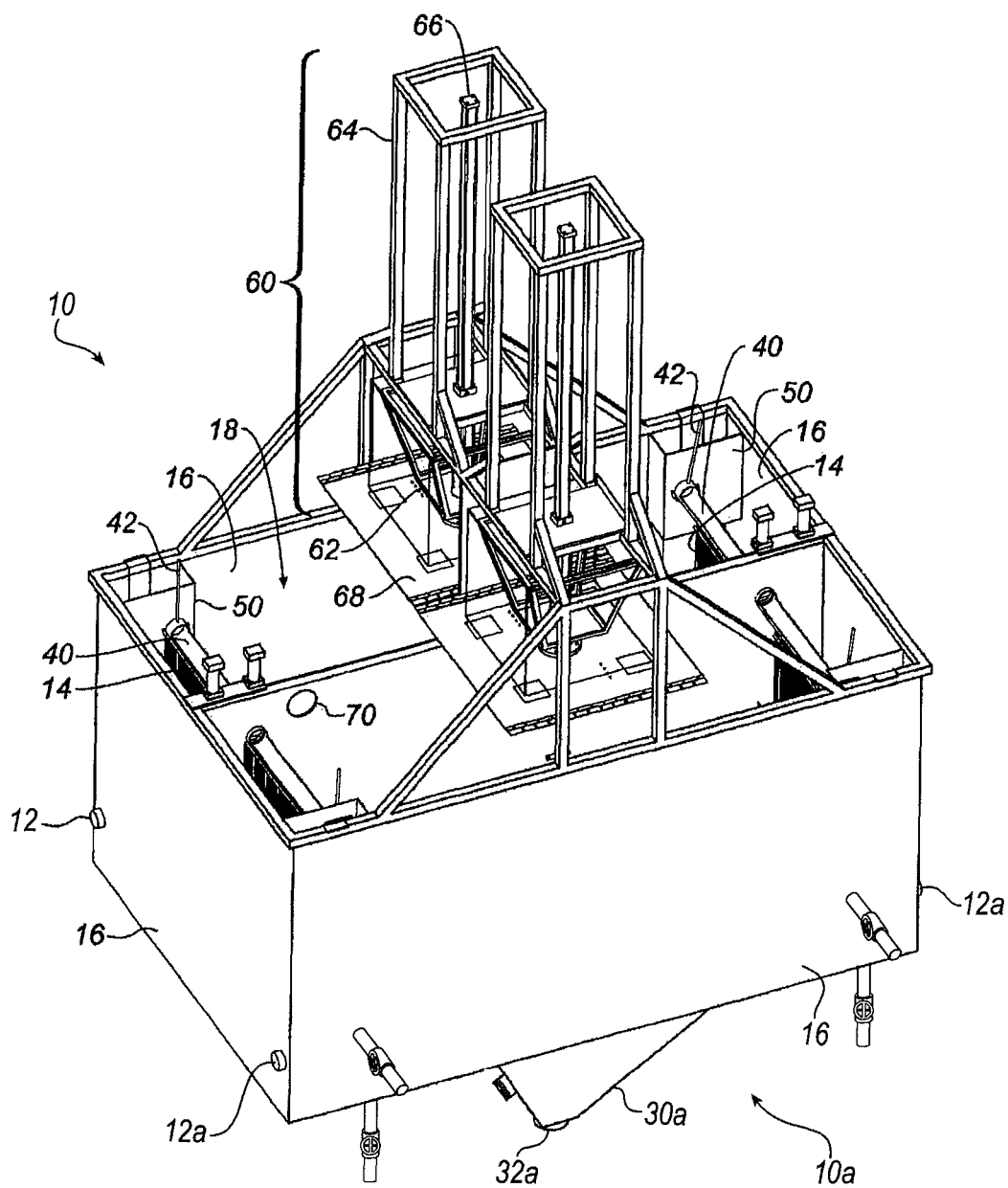
FIG. 3 is a perspective view of the embodiment shown in FIG. 1 including the screen box assembly.

Further referring to FIG. 3, the first primary settling tank 10 is shown with the screen box assembly 60, which includes a screen box 62 with a water outlet 63 (as shown in FIGS. 1 and 2), supporting framework 64, a hydraulic actuator 66 (a winch with pulley and cable (not shown) may be used as well) and baffle plate 68. The position of the screen box 62 determines the level of waste water 80 in the first primary settling tank 10. An overflow outlet 70 prevents waste water 80 from flowing over the outer walls 16 of the primary settling tank 10 if the waste water 80 level rises too high. FIG. 3 also shows a second primary settling tank 10a, also with outer walls 16. Second primary settling tank 10a has features analogous to those of primary settling tank 10, such as second influent pipes 12a, a second sludge hopper 30a, and a second outlet 32a, and is also shown with a screen box assembly 60.

Figure 4:
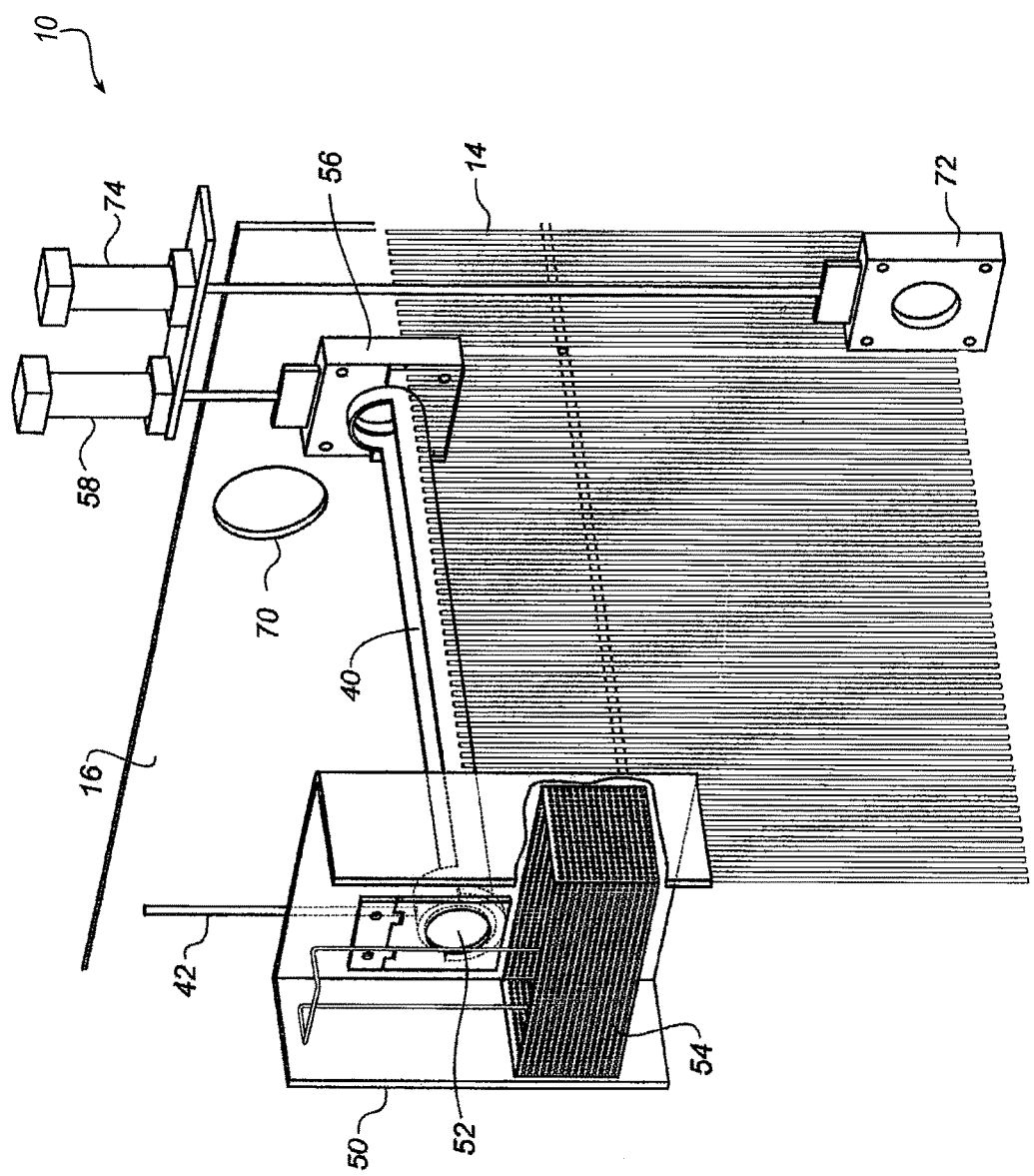
FIG. 4 is a partial-cutaway perspective view of the embodiment shown in FIG. 1.
Figure 5:
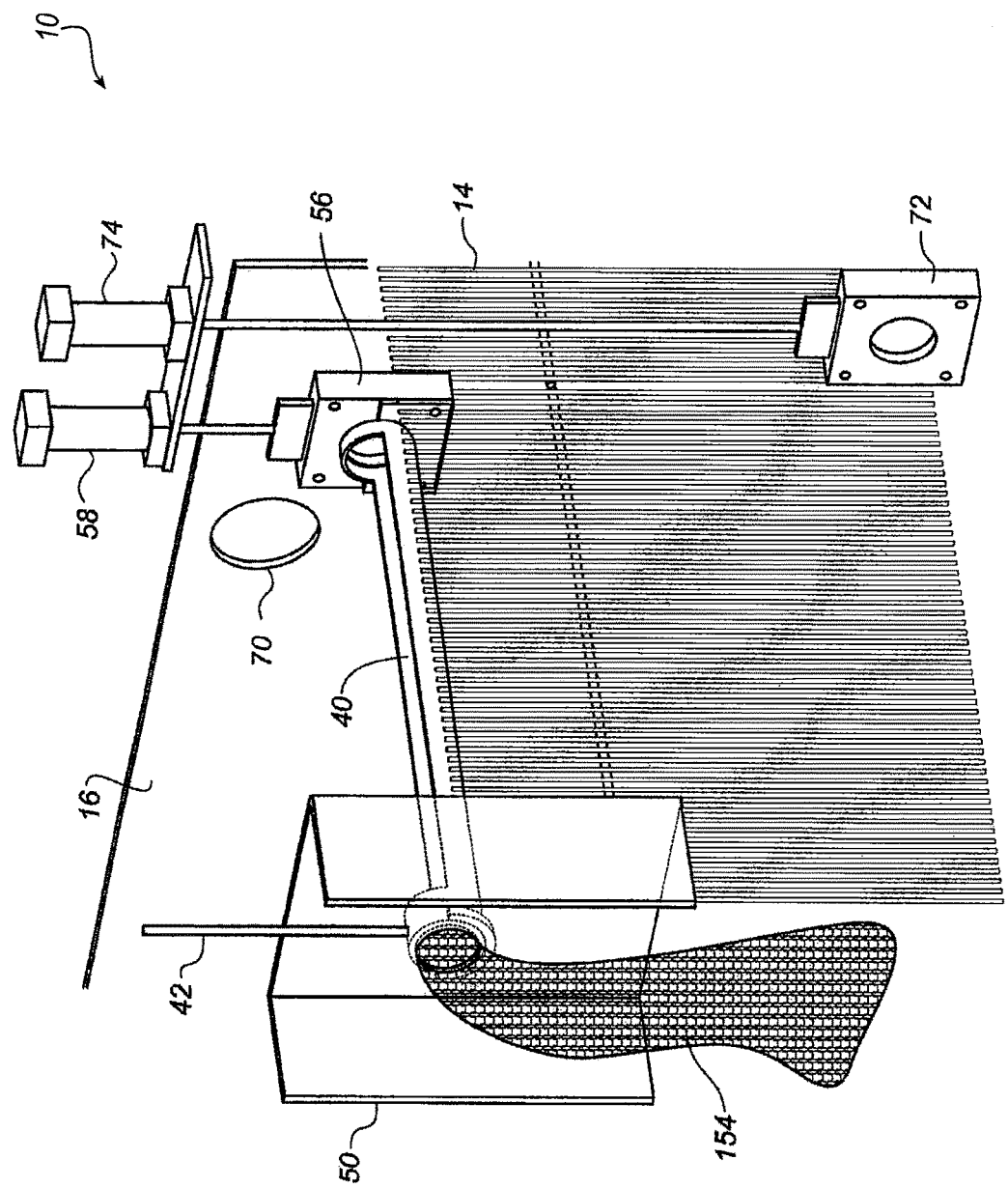
FIG. 5 is a partial-cutaway perspective view showing an alternate embodiment of the present invention.

FIG. 4 shows the first primary settling tank 10 with some of the outer walls 16 removed to reveal the internal components. The first bar screen 14 is shown with the first scum and floatables collection box 50 adjacent one side of the first bar screen 14. The bottom of first bar screen 14 is lower than the elevation of weir 86 (FIG. 7) thus increasing the bar screen/liquid contact area thus reducing the velocity (of liquid flowing) through first bar screen 14. The first scum and floatables collection box 50 includes a first flap valve 52 which allows waste water 80, scum and floatables 102 to enter the first scum and floatables collection box 50 but prevents flow in the opposite direction. A screened basket 54 is provided in the first scum and floatables collection box 50, which allows waste water 80 to pass through. A valve 56 is provided at the end of the first scum and floatables trough 40 to control the flow of waste water 80 across the first scum and floatables trough 40. Actuator 58 opens and closes the valve 56. A backwash valve 72 and backwash valve actuator 74 are provided, the purpose of which will be described below. FIG. 5 shows the use of a porous bag 154 in place of the screened basket 54. Porous bag 154 operates in a manner similar to the screened basket 54.

Figure 6:
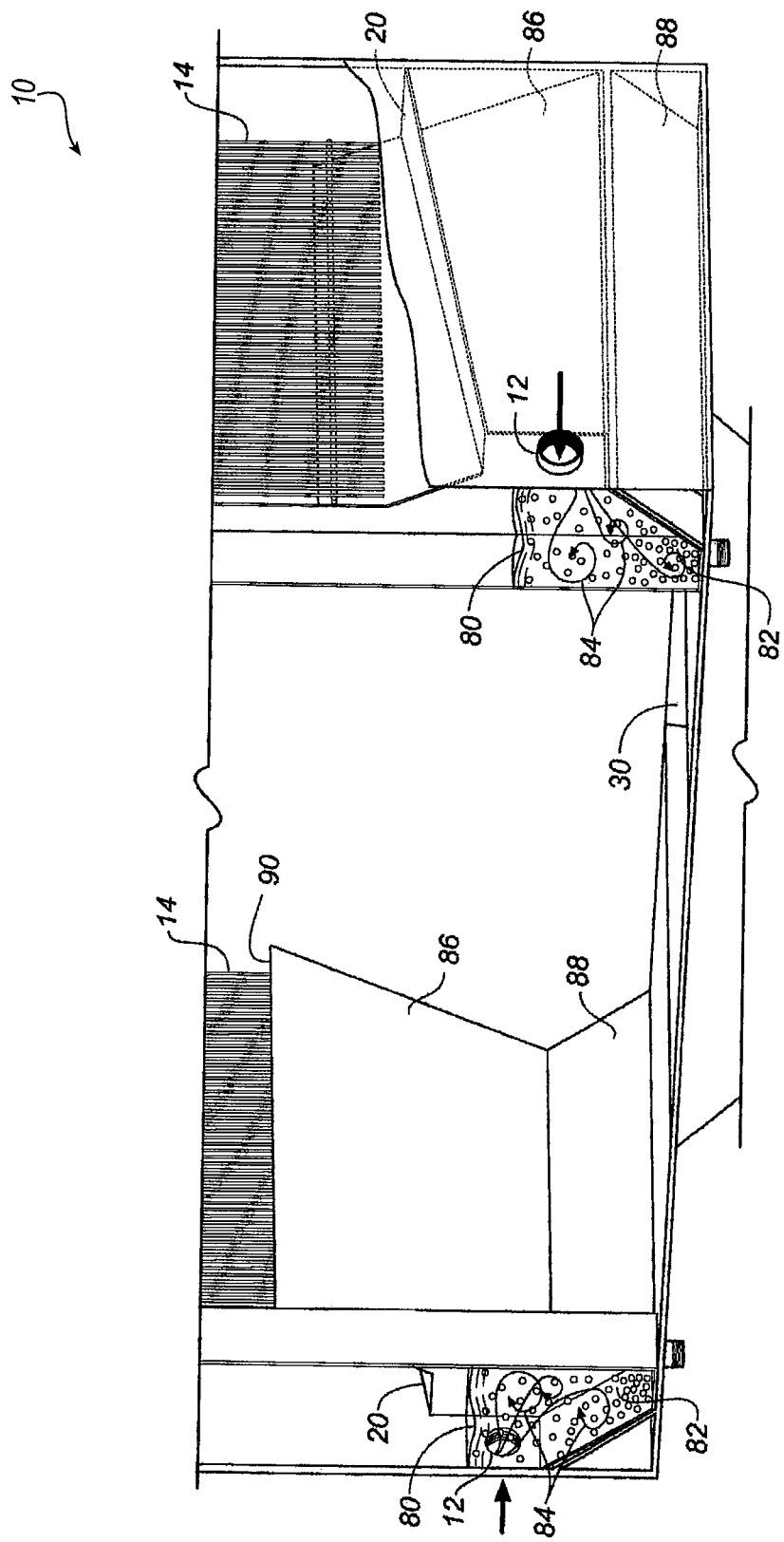
FIG. 6 is a partial-cutaway perspective view of the embodiment shown in FIG. 1.
Figure 7:
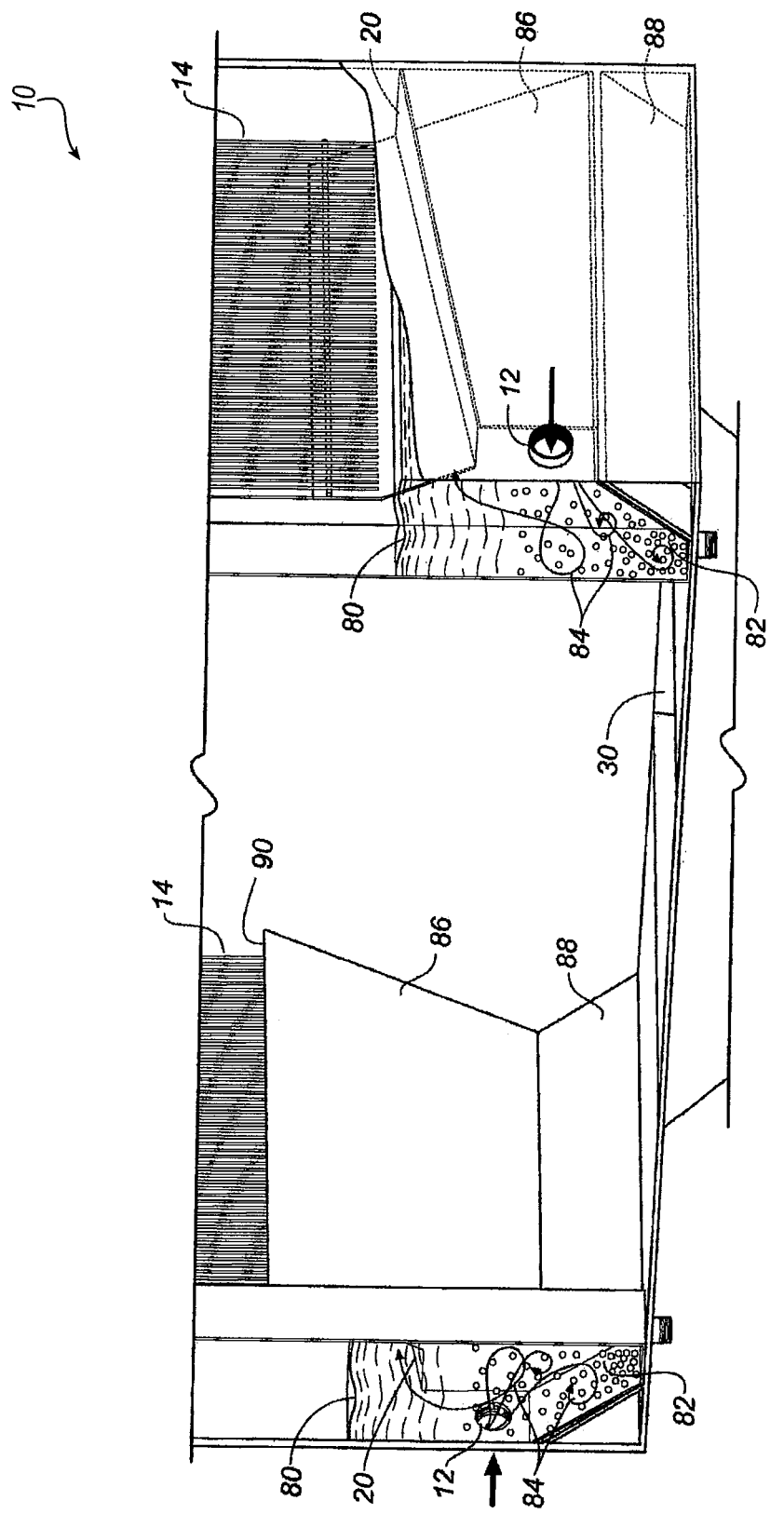
FIG. 7 is a partial-cutaway perspective view of the embodiment shown in FIG. 1.
Figure 8:
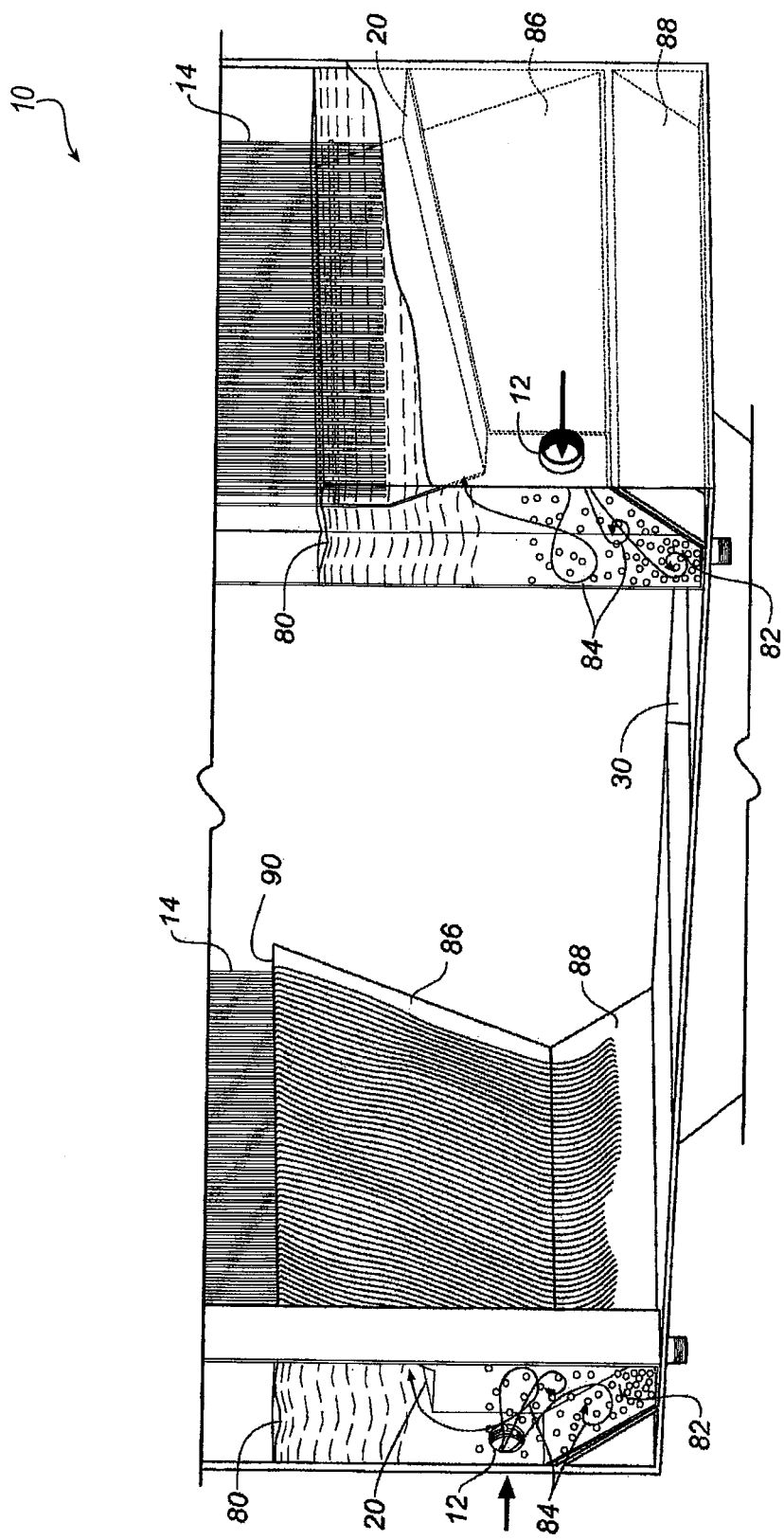
FIG. 8 is a partial-cutaway perspective view of the embodiment shown in FIG. 1.

FIGS. 6-8 illustrate the fill cycle of the first primary settling tank 10. Waste water 80 enters the primary settling tank 10 through influent pipes 12. As it enters the influent feed basin 82 it becomes turbulent as represented by arrows 84. The waste water 80 level rises to the influent feed trough 20 as shown in FIG. 7. A weir 86 is spaced away from the first bar screen 14 and is placed at an angle of preferably 60 to 70 degrees from the horizontal. A bottom directional flow plate 88 slopes toward the first sludge hopper 30. As shown in FIG. 8, waste water 80 passing over the top edge 90 of the weir 86 flows down the exterior surface of weir 86 in generally laminar flow. The slope of the bottom directional flow plate 88 increases the settling volume of the tank. Because the waste water 80 flows down the surface of the weir 86 in laminar flow, there is no free fall of the liquid, thus no air entrainment, facilitating the settling of sludge. The fill cycle of second primary settling tank 10a proceeds in a manner analogous to the fill cycle of first primary settling tank 10.

Figure 9:
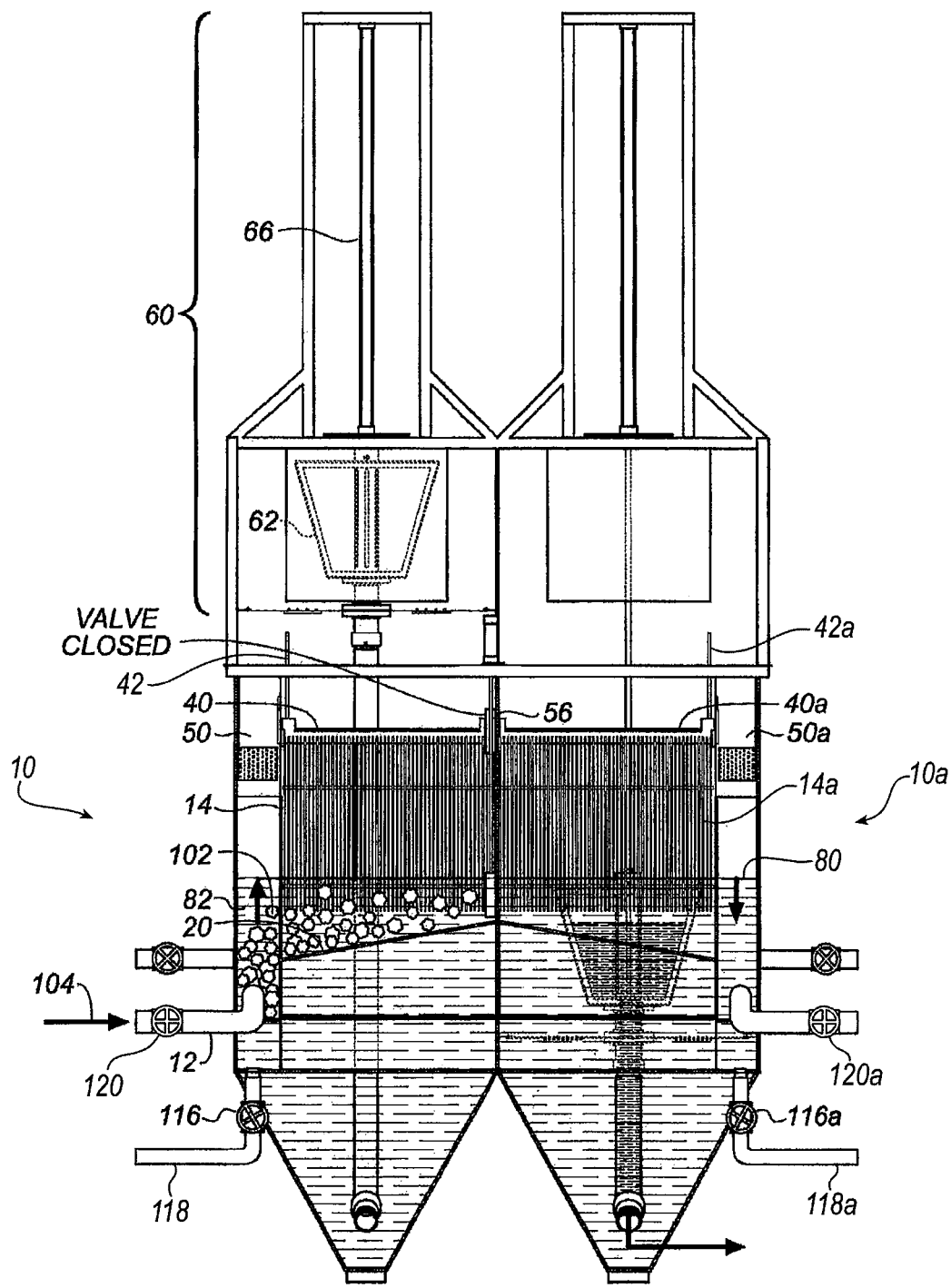
FIG. 9 is a partial-cutaway front elevation view of the embodiment shown in FIG. 3.
Figure 10:
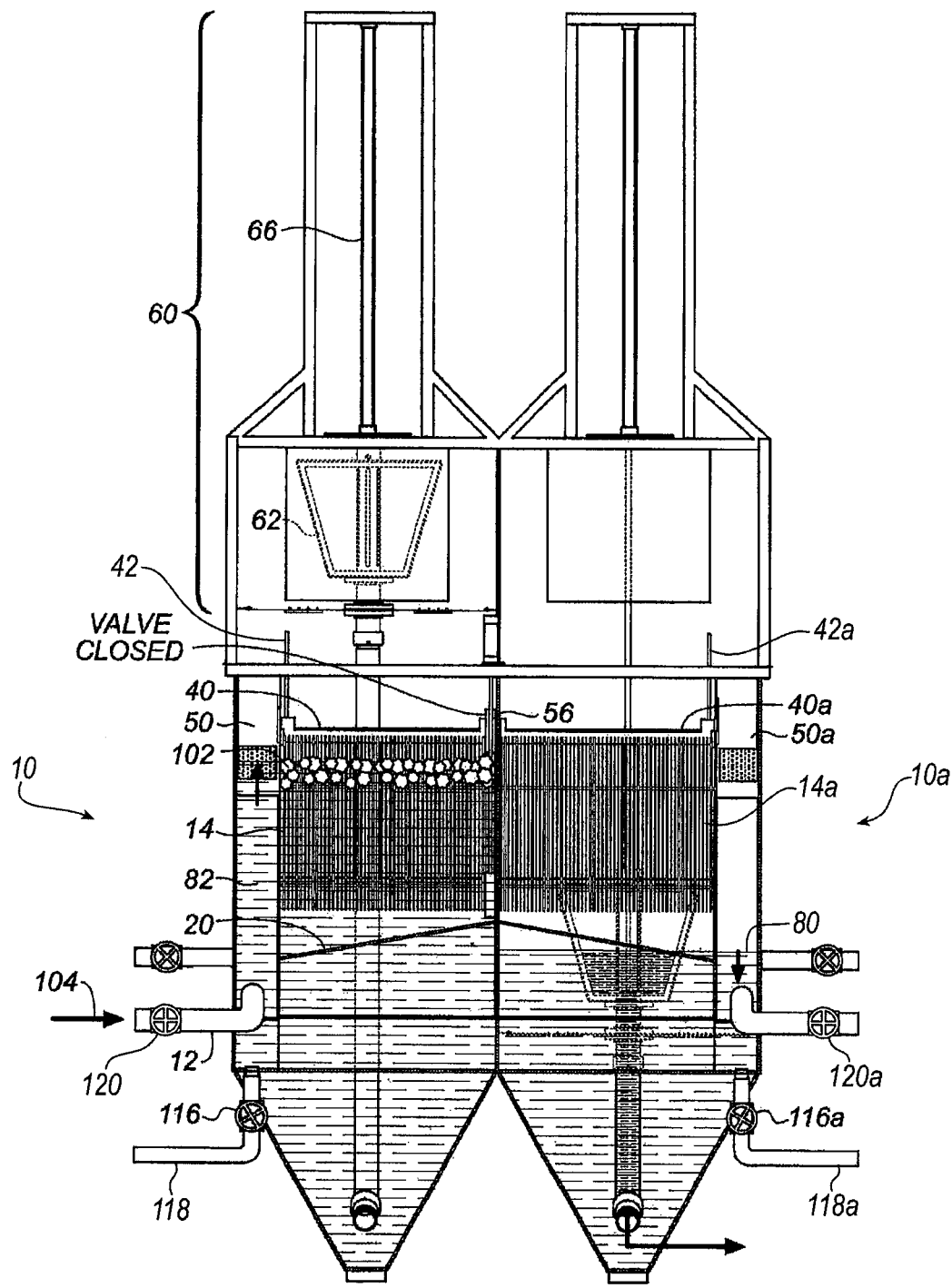
FIG. 10 is a partial-cutaway front elevation view of the embodiment shown in FIG. 3.
Figure 11:
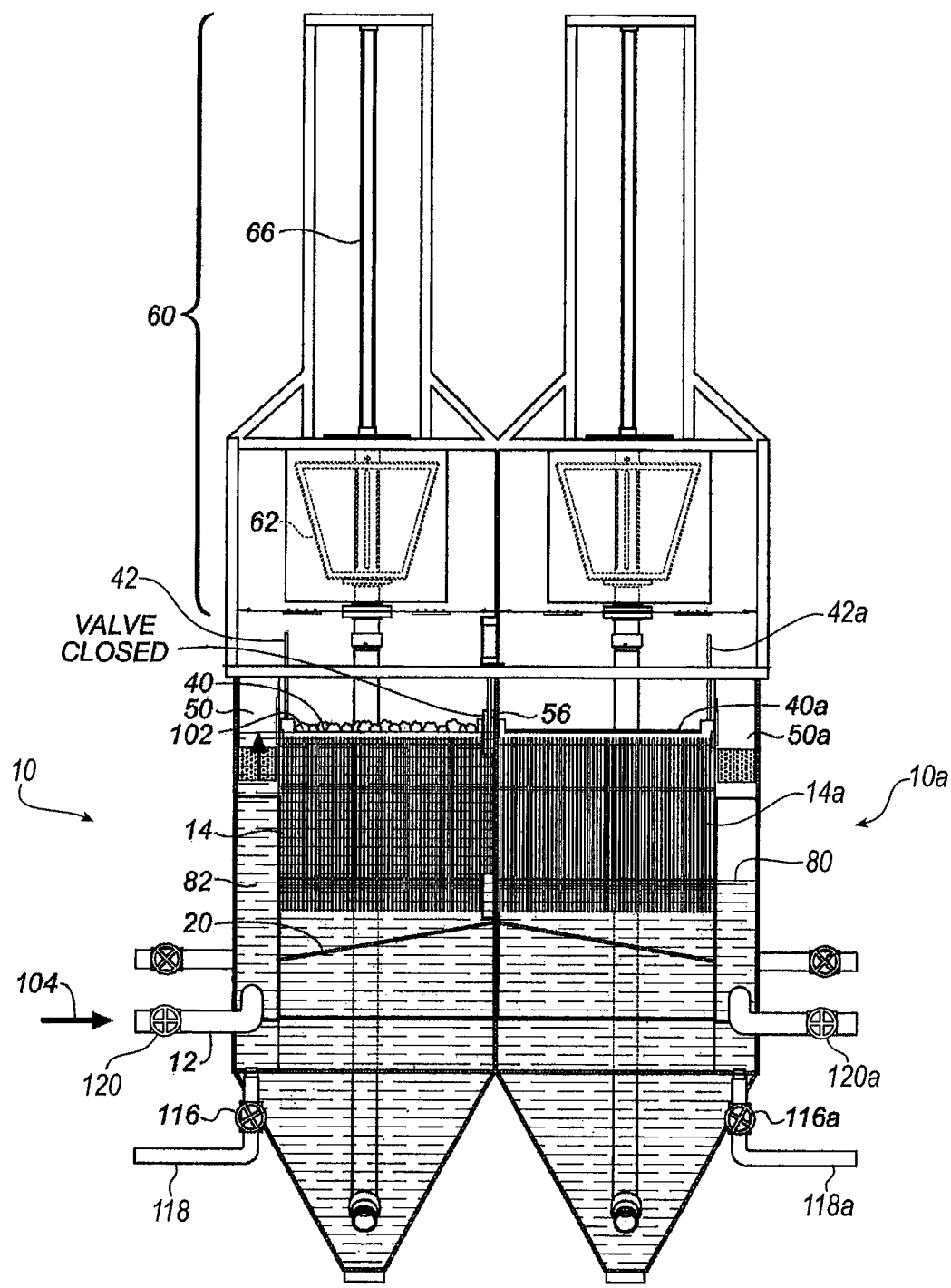
FIG. 11 is a partial-cutaway front elevation view of the embodiment shown in FIG. 3.
Figure 12:
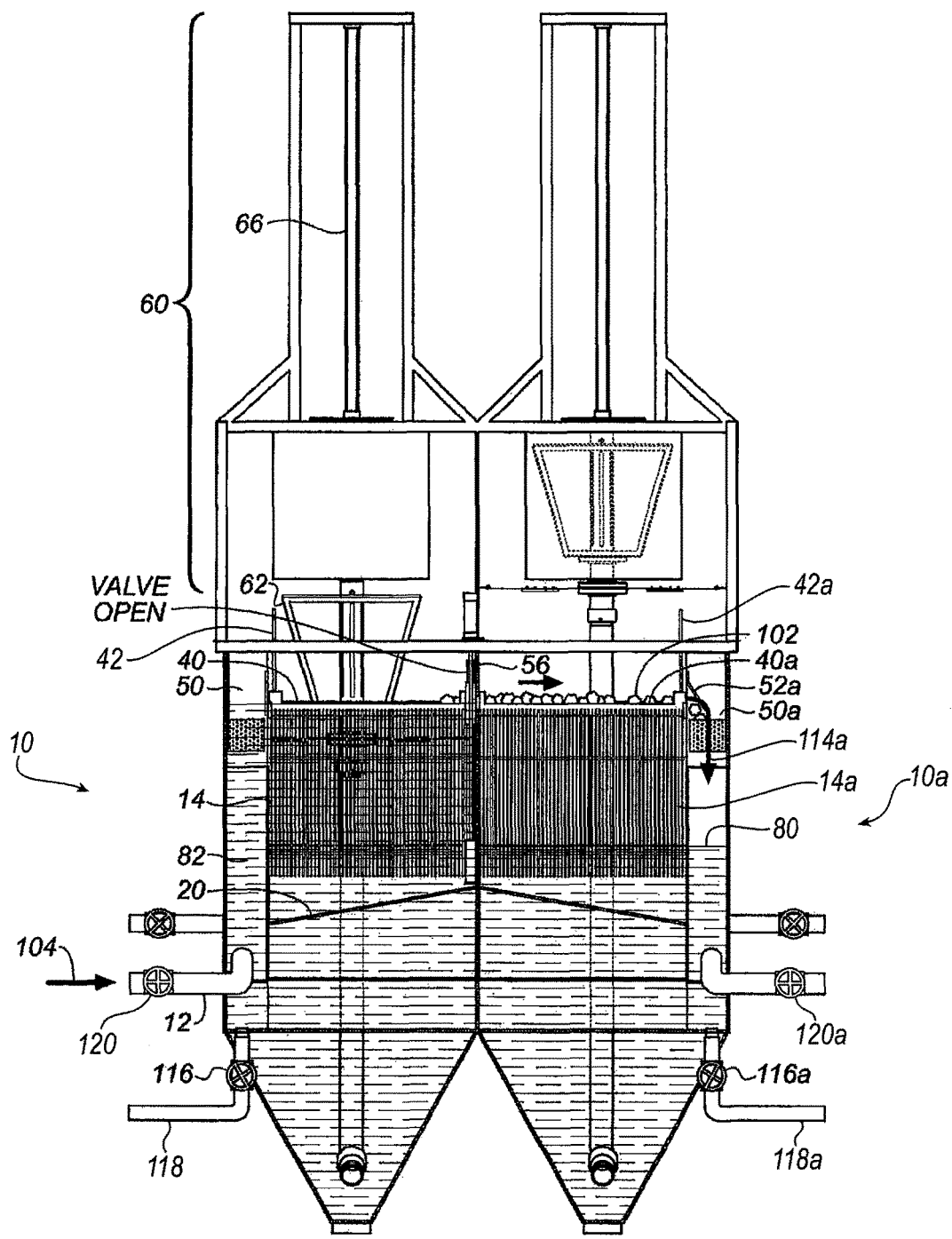
FIG. 12 is a partial-cutaway front elevation view of the embodiment shown in FIG. 3.

FIGS. 9 through 19 illustrate the floatables removal cycle. The floatables 102 are shown at various levels and positions throughout FIGS. 9 through 19. FIGS. 9 through 12 illustrate the floatables 102 removal cycle in a first direction. In FIG. 9 waste water 80, scum and floatables 102 enter first primary settling tank 10 through the first influent pipe 12 (with open first inlet valve 120) and flow into the influent feed basin 82 as represented by arrow 104. The floatables 102 are shown on the influent feed trough 20. The floatables 102 are too large to pass through the first bar screen 14. FIG. 10 shows floatables 102 rising to the top of the first bar screen 14. FIG. 11 shows the floatables 102 which have risen to the top of the first bar screen 14 and are in the first scum and floatables trough 40. In FIG. 12, the valve 56 has been opened and the floatables 102 have been moved through valve 56 by the liquid above and in the first scum and floatables trough 40 across second scum and floatables trough 40a, through second flap valve 52a and into second collection box 50a, second scum and floatables trough 40a with second handle 42a, second flap valve 52a, and second collection box 50a being present in a second primary settling tank 10a. Waste water 80 flowing as represented by second arrow 114a flows through second collection box 50a and to exit through second exit valve 116a to second exit pipe 118a.

Figure 13:
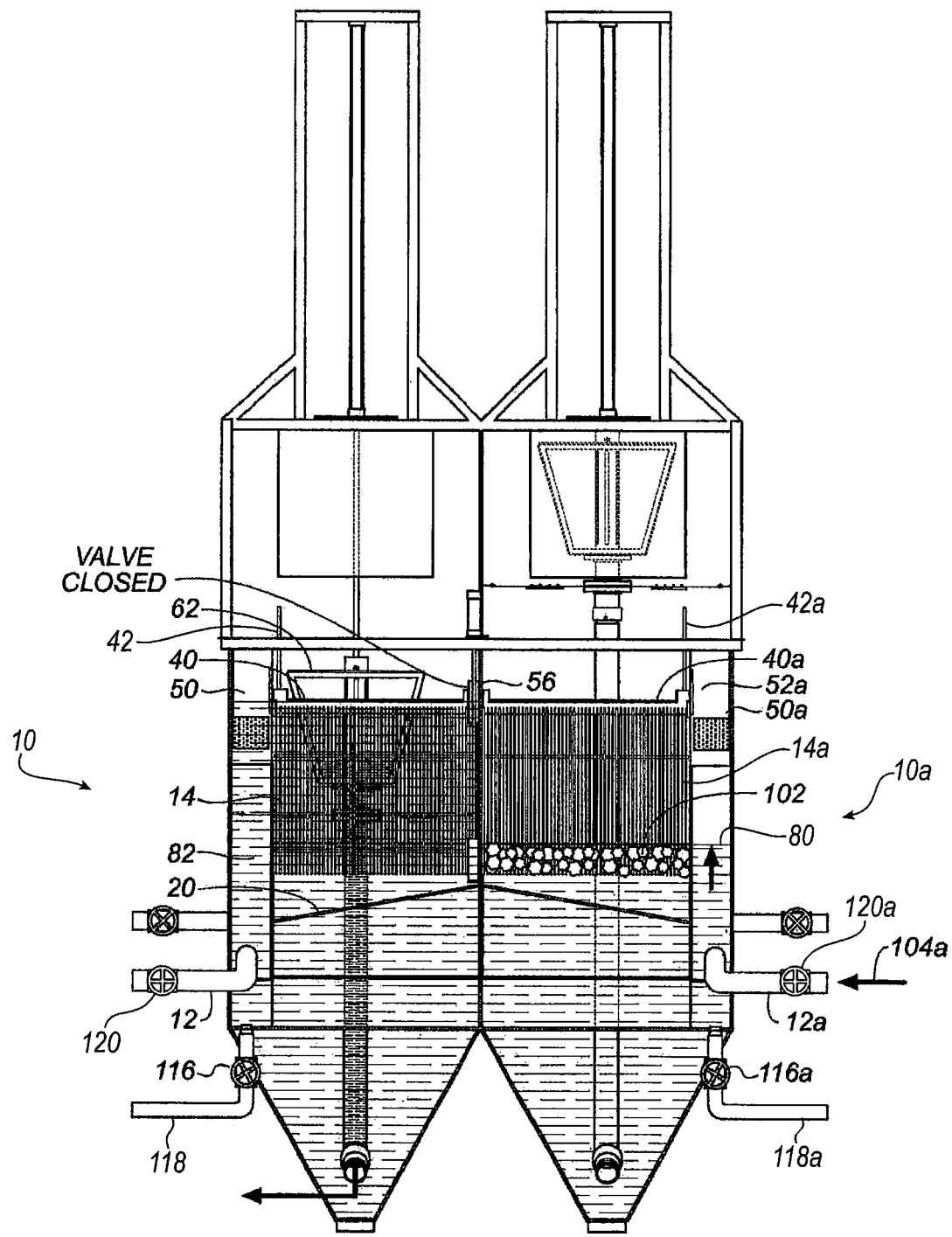
FIG. 13 is a partial-cutaway front elevation view of the embodiment shown in FIG. 3.
Figure 14:
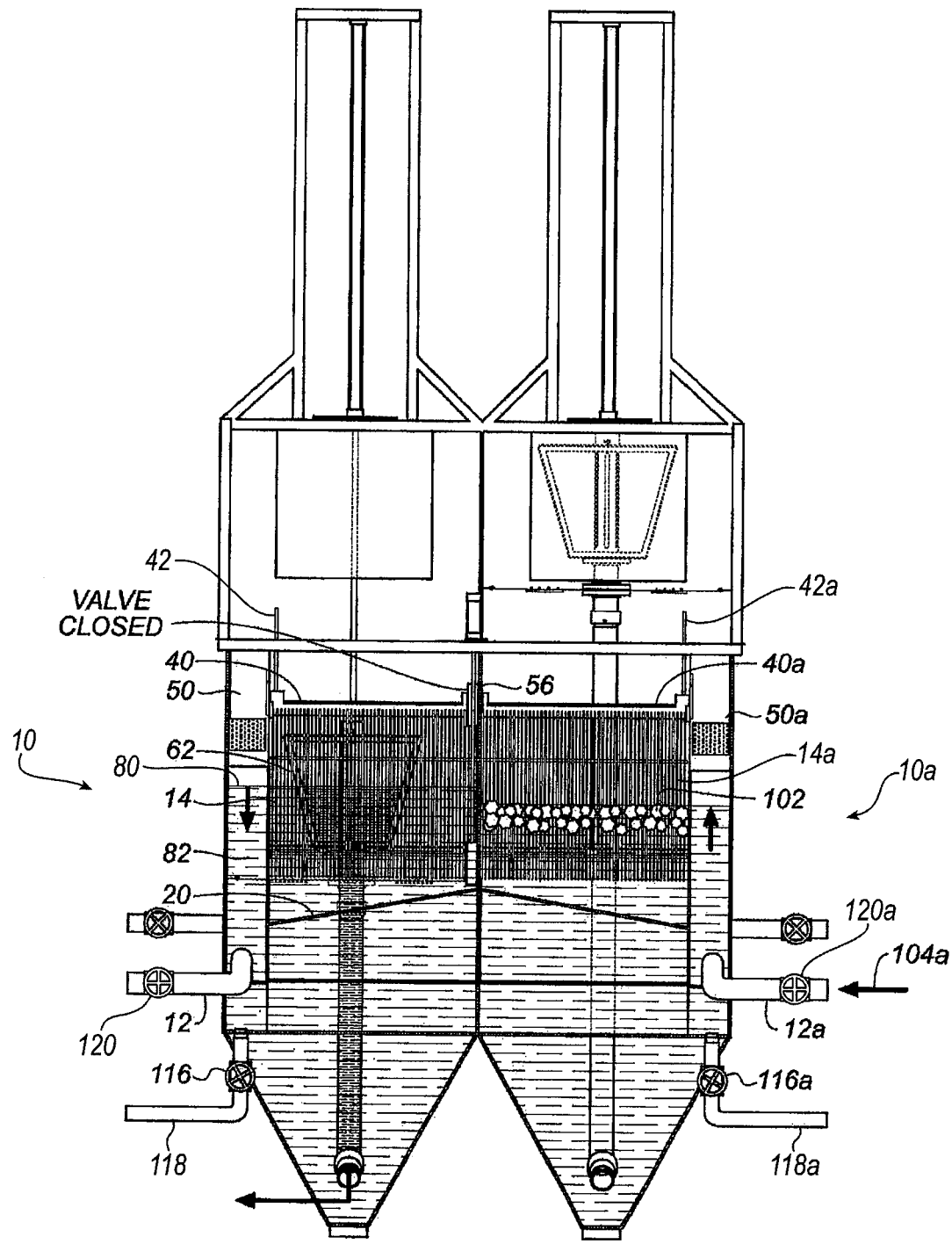
FIG. 14 is a partial-cutaway front elevation view of the embodiment shown in FIG. 3.
Figure 15:
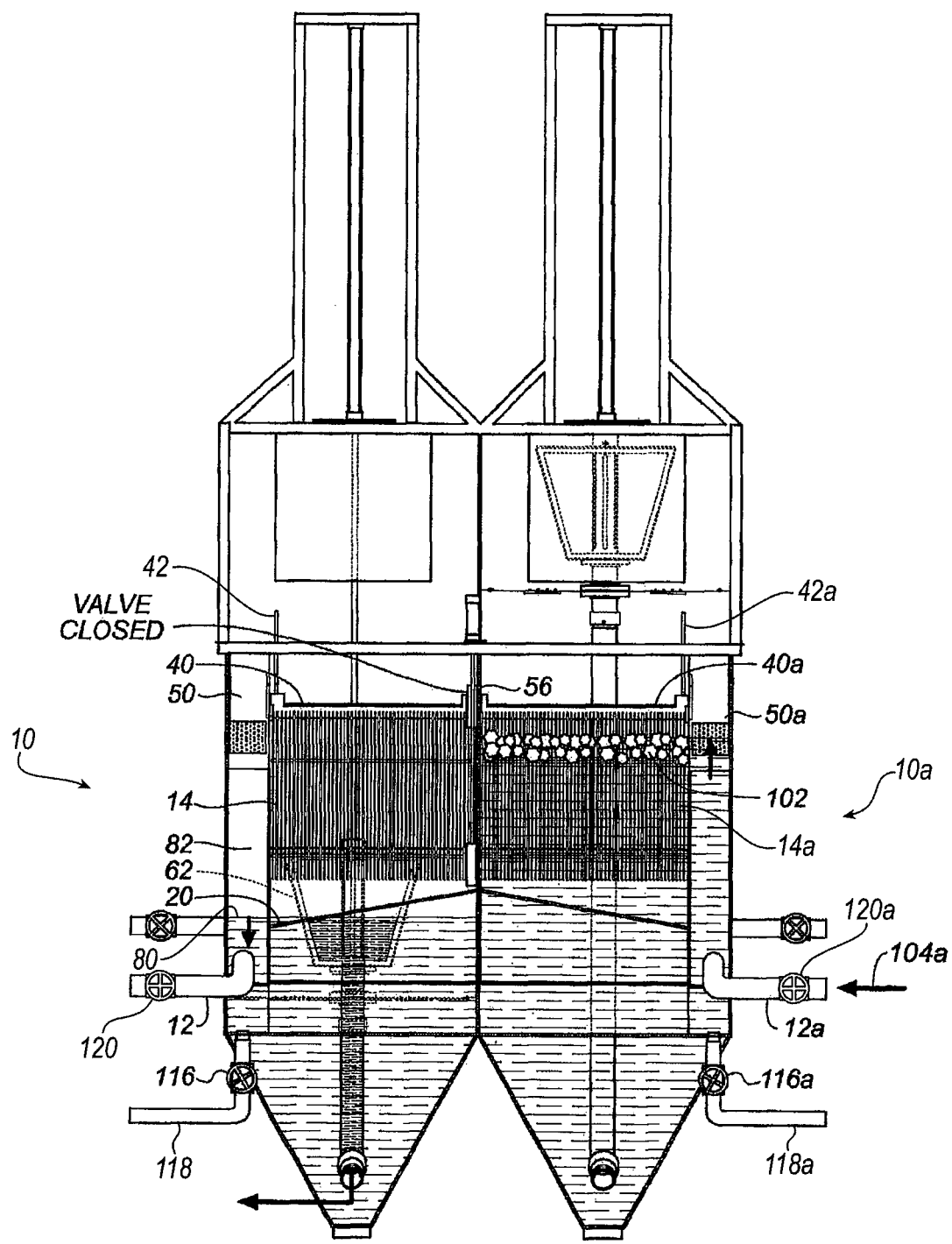
FIG. 15 is a partial-cutaway front elevation view of the embodiment shown in FIG. 3.
Figure 16:
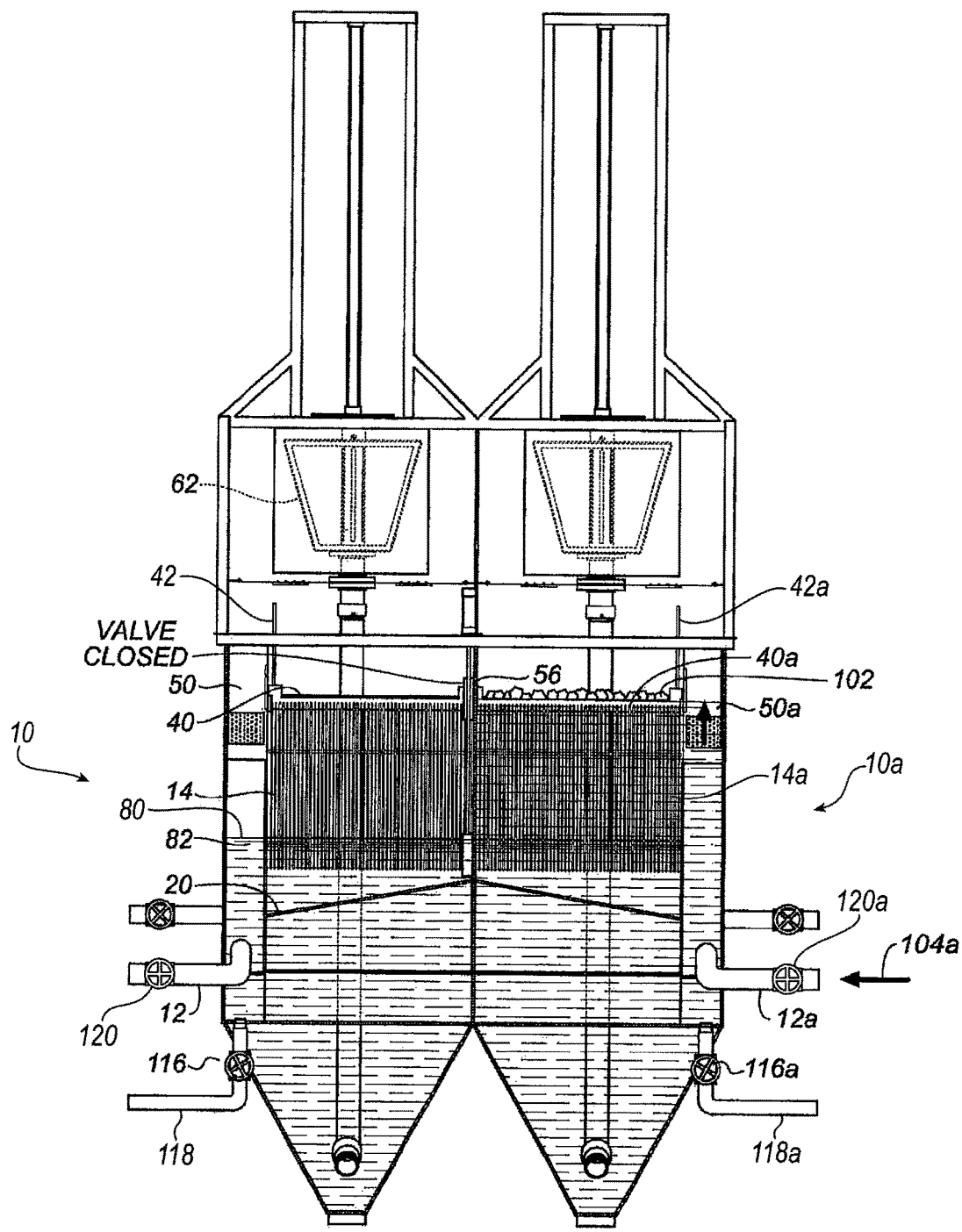
FIG. 16 is a partial-cutaway front elevation view of the embodiment shown in FIG. 3.
Figure 17:
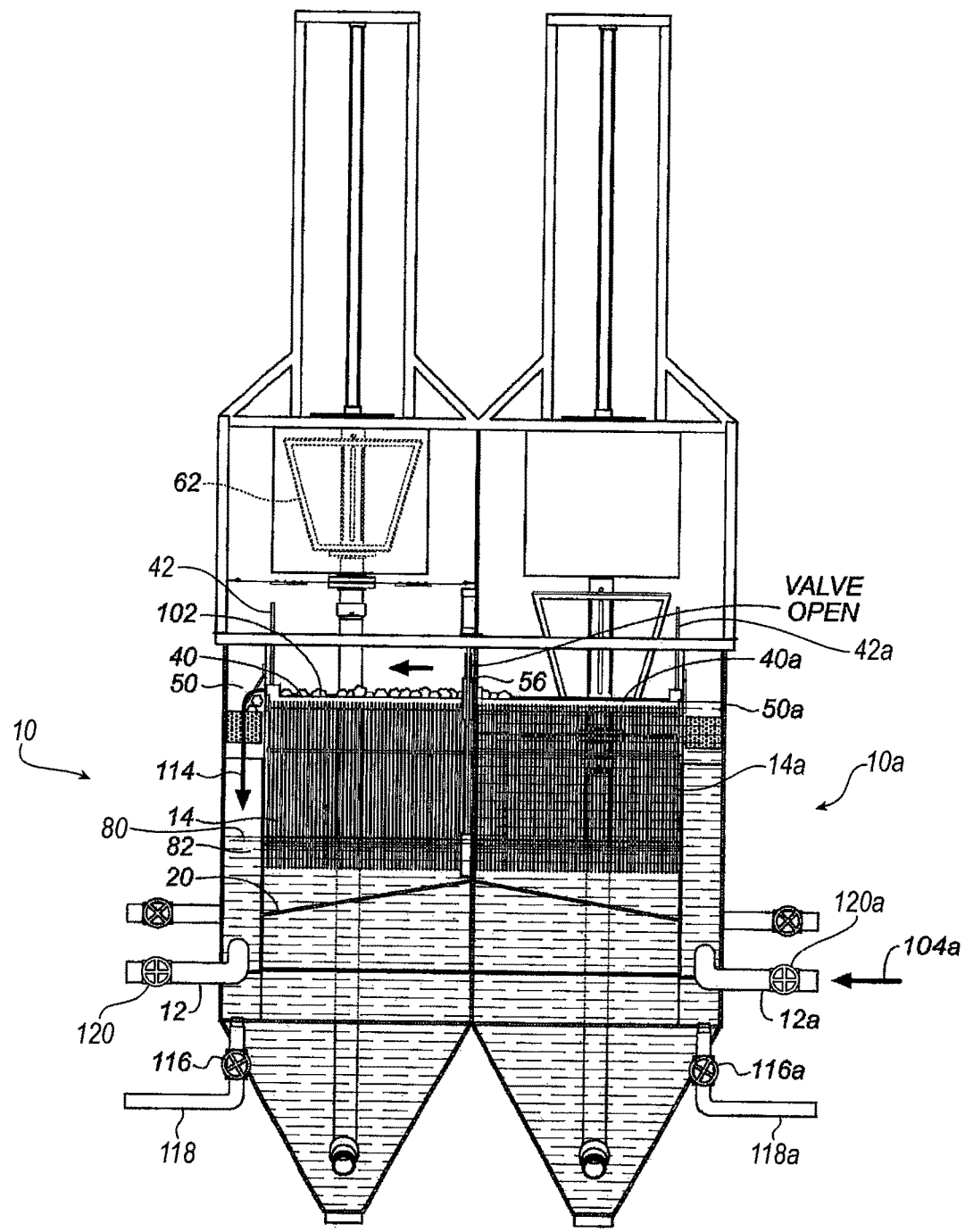
FIG. 17 is a partial-cutaway front elevation view of the embodiment shown in FIG. 3.
Figure 18:
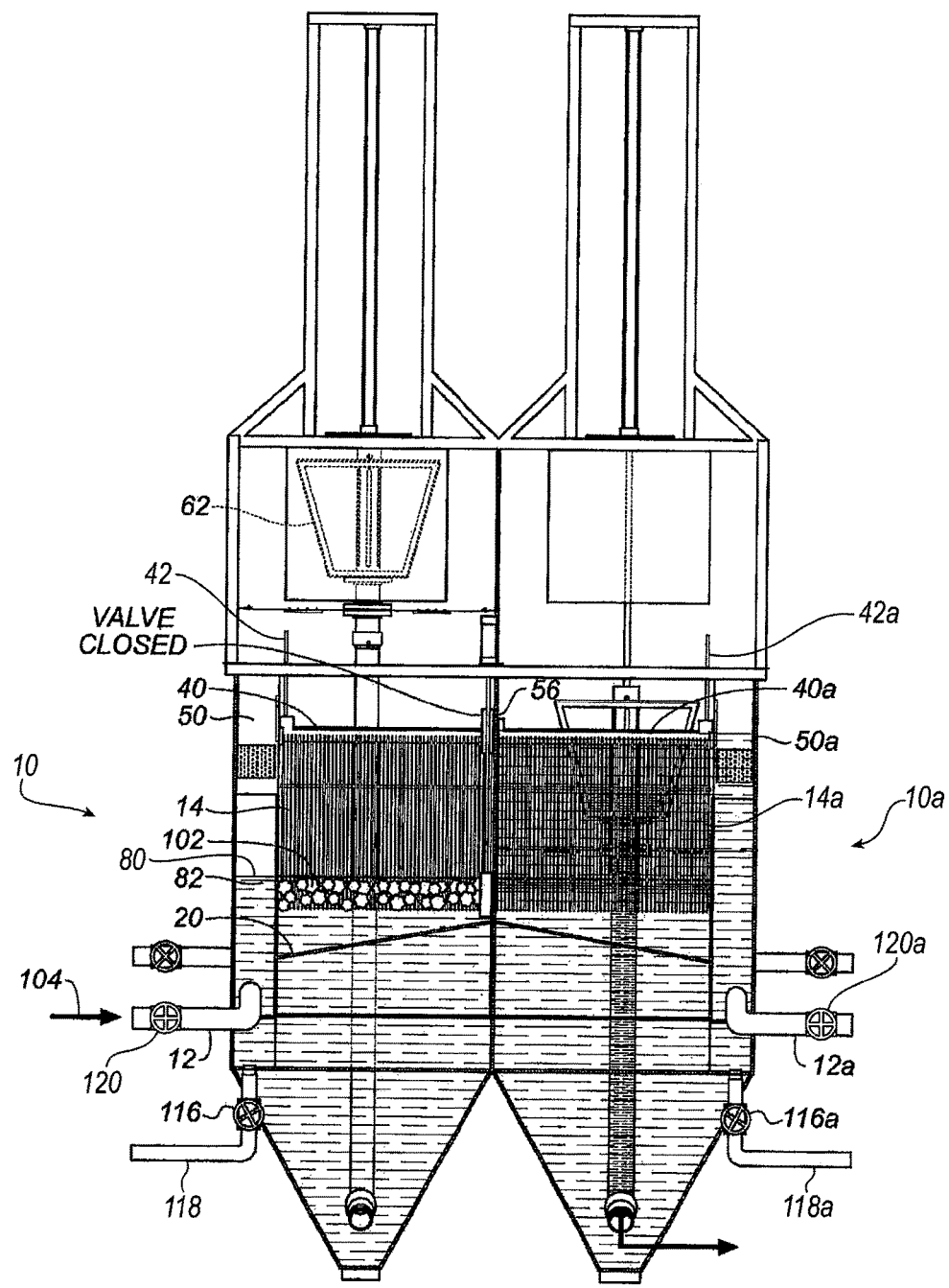
FIG. 18 is a partial-cutaway front elevation view of the embodiment shown in FIG. 3.
Figure 19:
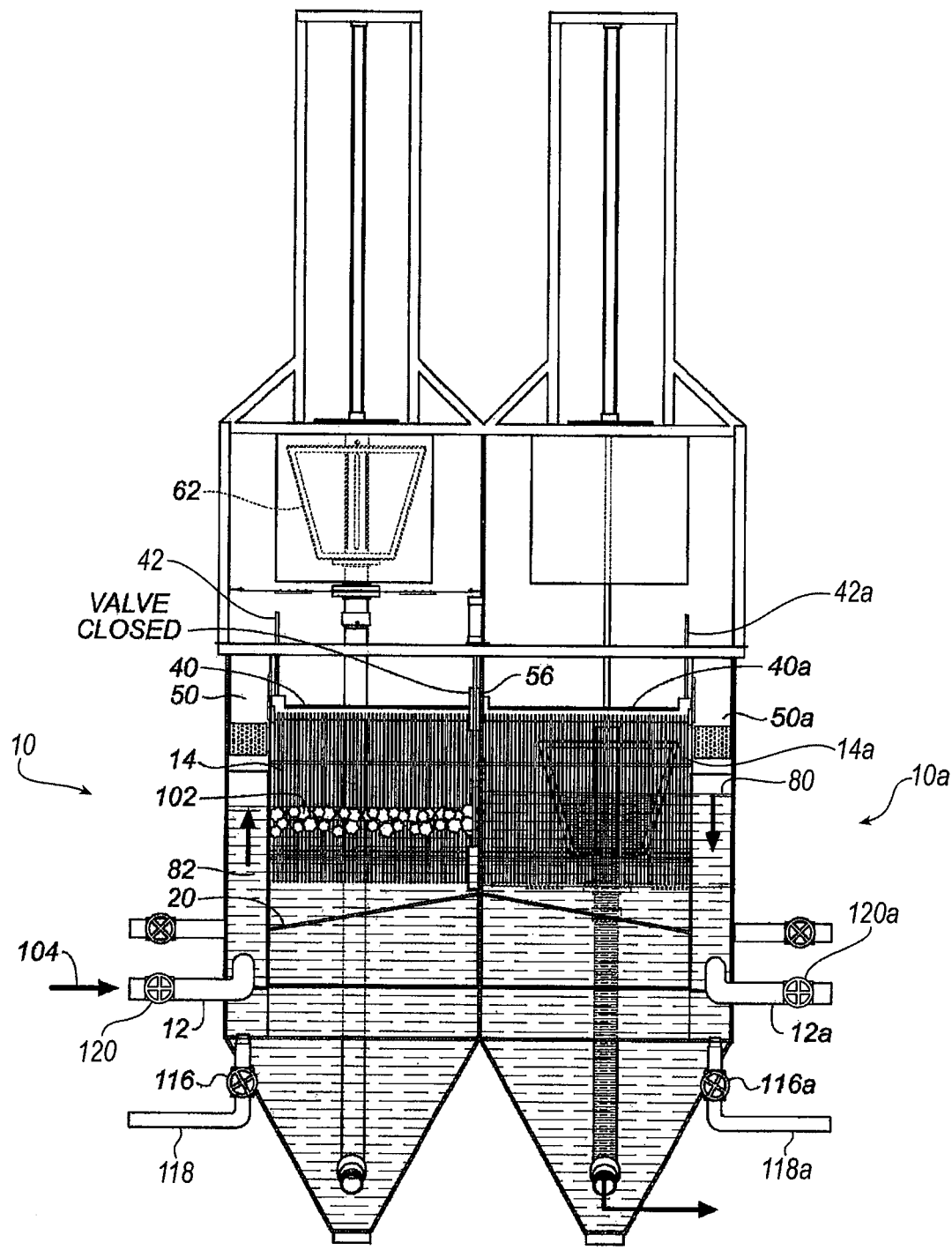
FIG. 19 is a partial-cutaway front elevation view of the embodiment shown in FIG. 3.

FIGS. 13 through 17 illustrate the floatables removal cycle in the opposite direction. Waste water 80, scum and floatables 102 enter second primary settling tank 10a through second influent pipe 12a (with open second inlet valve 120a), flowing as illustrated by second arrow 104a. As shown in FIG. 13, the floatables 102 move upward to the top of the second bar screen 14a and toward the second scum and floatables trough 40a. FIG. 14 shows floatables 102 rising towards second scum and floatables trough 40a. In FIG. 15, the floatables 102 are approaching the second scum and floatables trough 40a to be flushed through valve 56. FIG. 16 shows the floatables 102 ready to be flushed through valve 56, into first scum and floatables trough 40 and into first scum and floatables collection box 50. FIG. 17 shows the floatables 102 after they have been flushed through the valve 56 and the waste water 80 flowing as represented by first arrow 114 has flowed through the first scum and floatables collection box 50 to exit through first exit valve 116 to first exit pipe 118. FIGS. 18 and 19 illustrate the floatables removal process starting over again.

Figure 20:
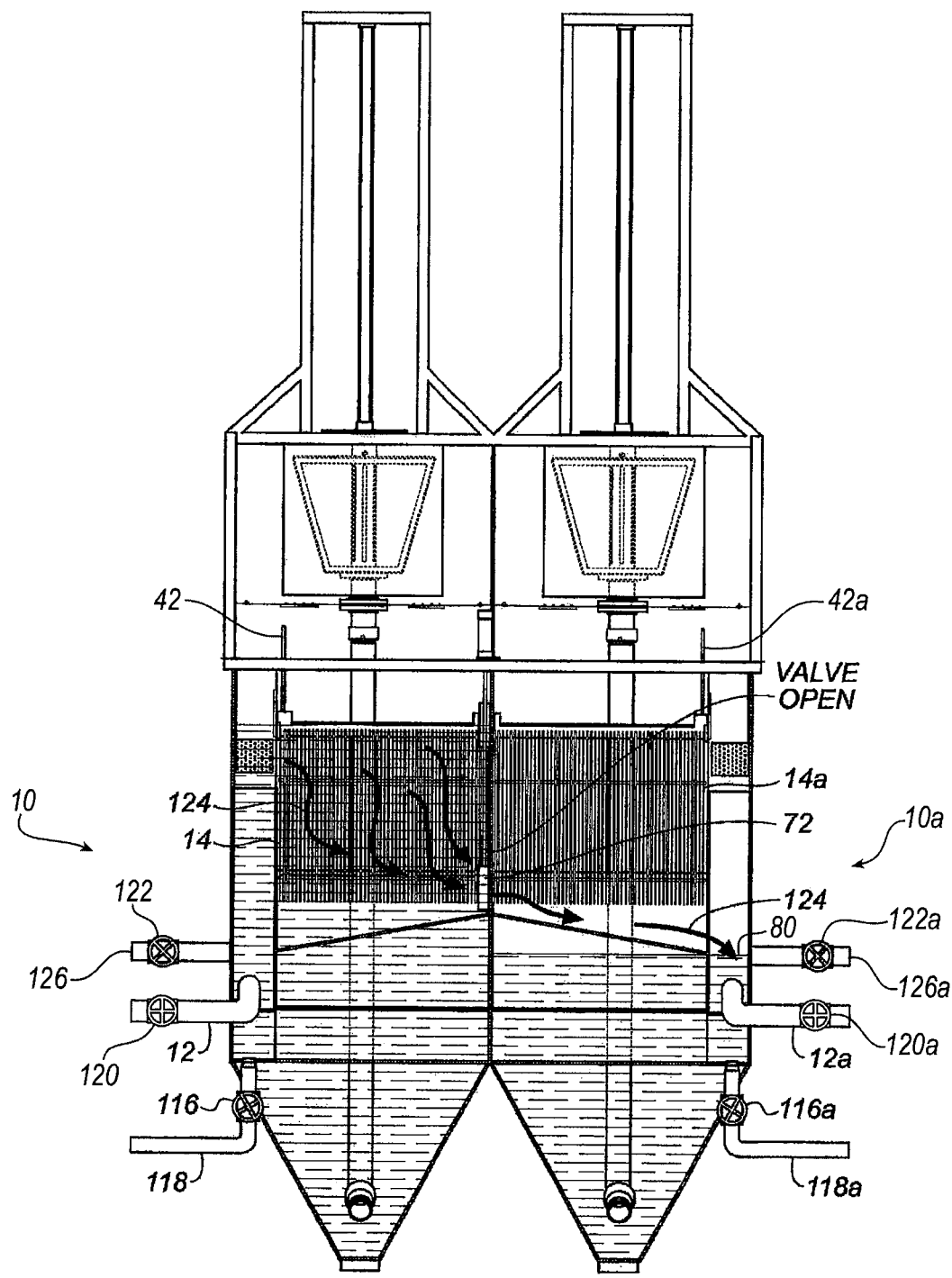
FIG. 20 is a partial-cutaway view of the embodiment shown in FIG. 3 illustrating the backwash cycle.
Figure 21:
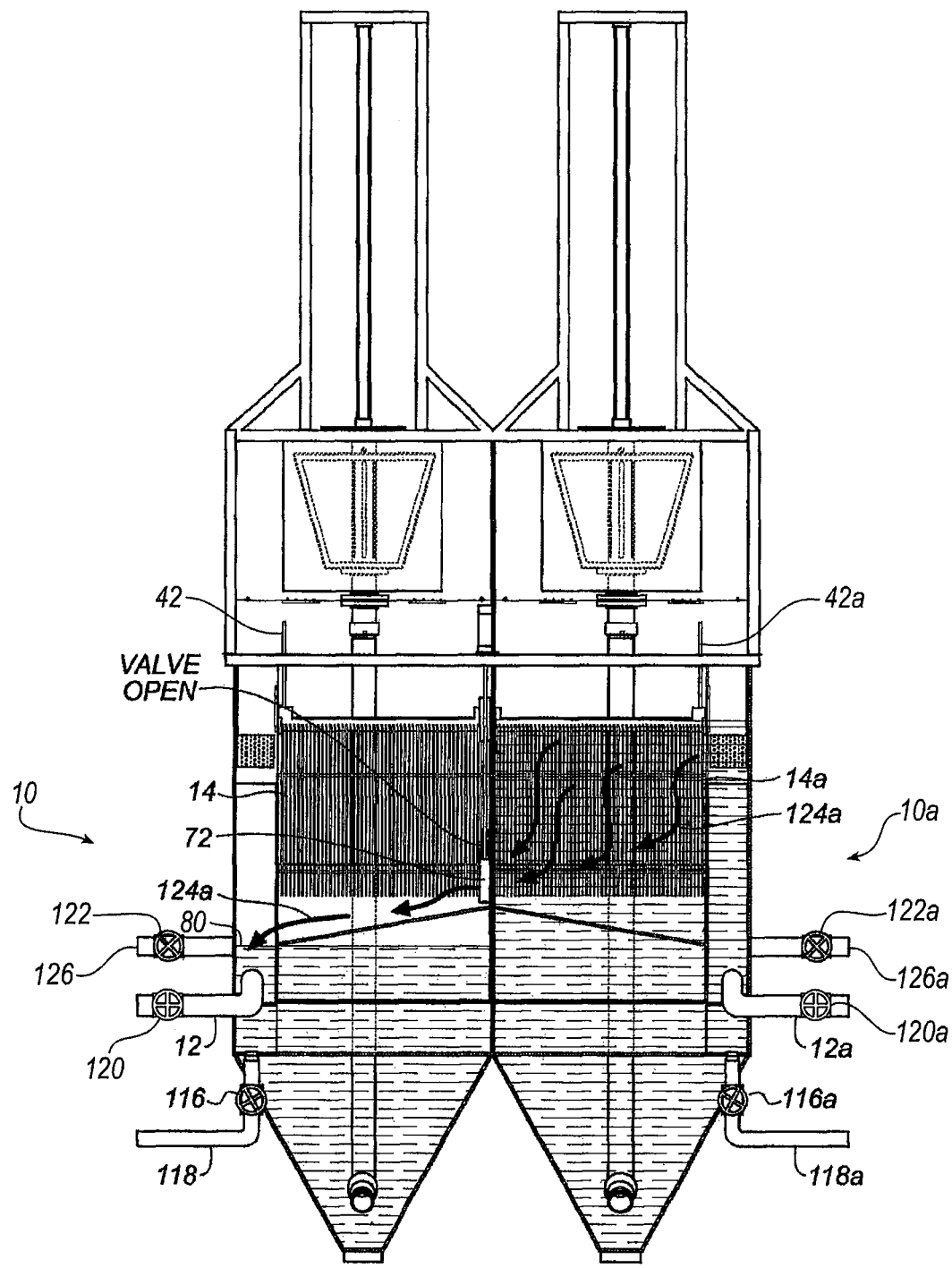
FIG. 21 is a partial-cutaway view of the embodiment shown in FIG. 3 illustrating the backwash cycle.
Figure 22:
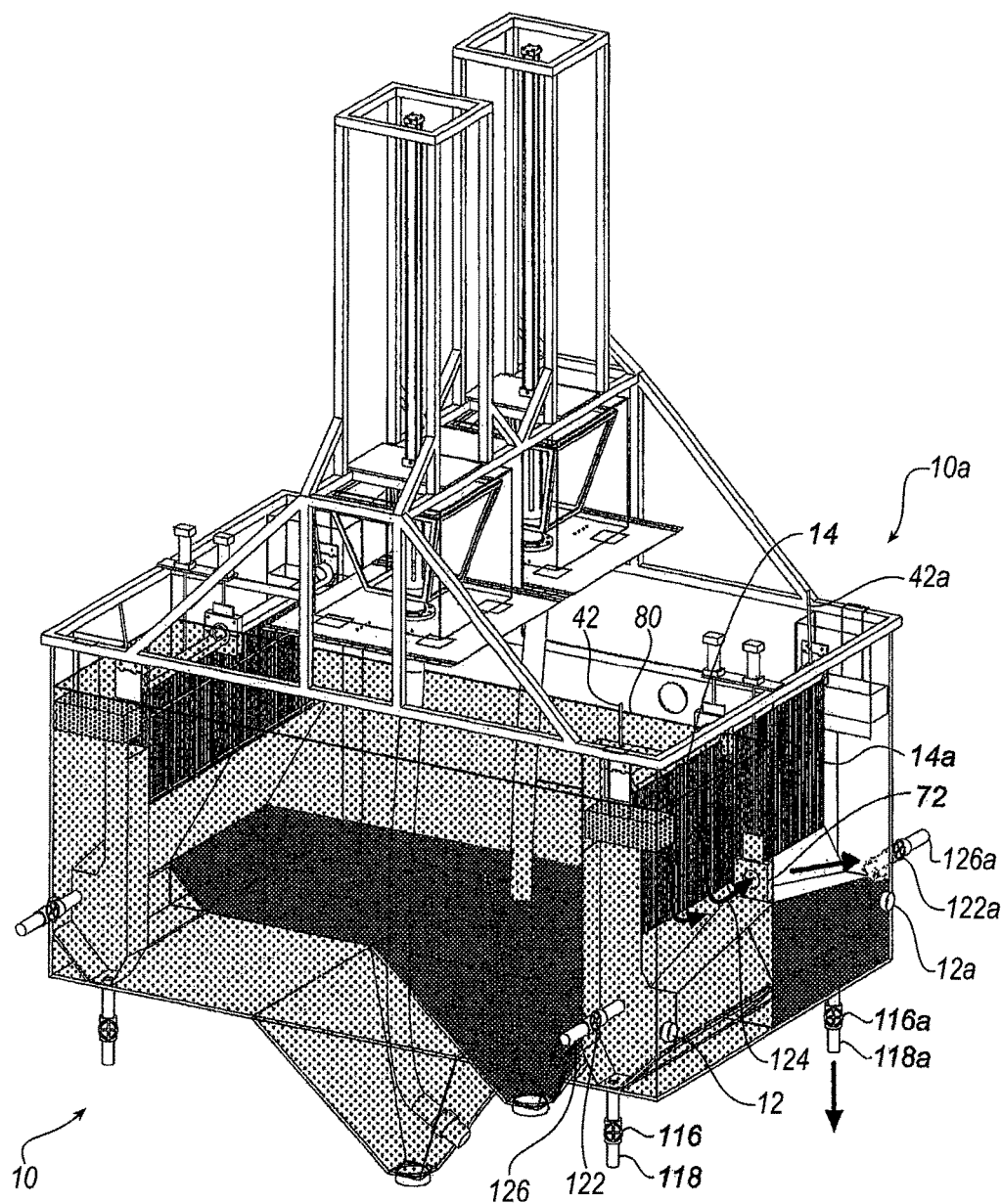
FIG. 22 is a perspective view of the embodiment shown in FIG. 3 illustrating the backwash cycle.
Figure 23:
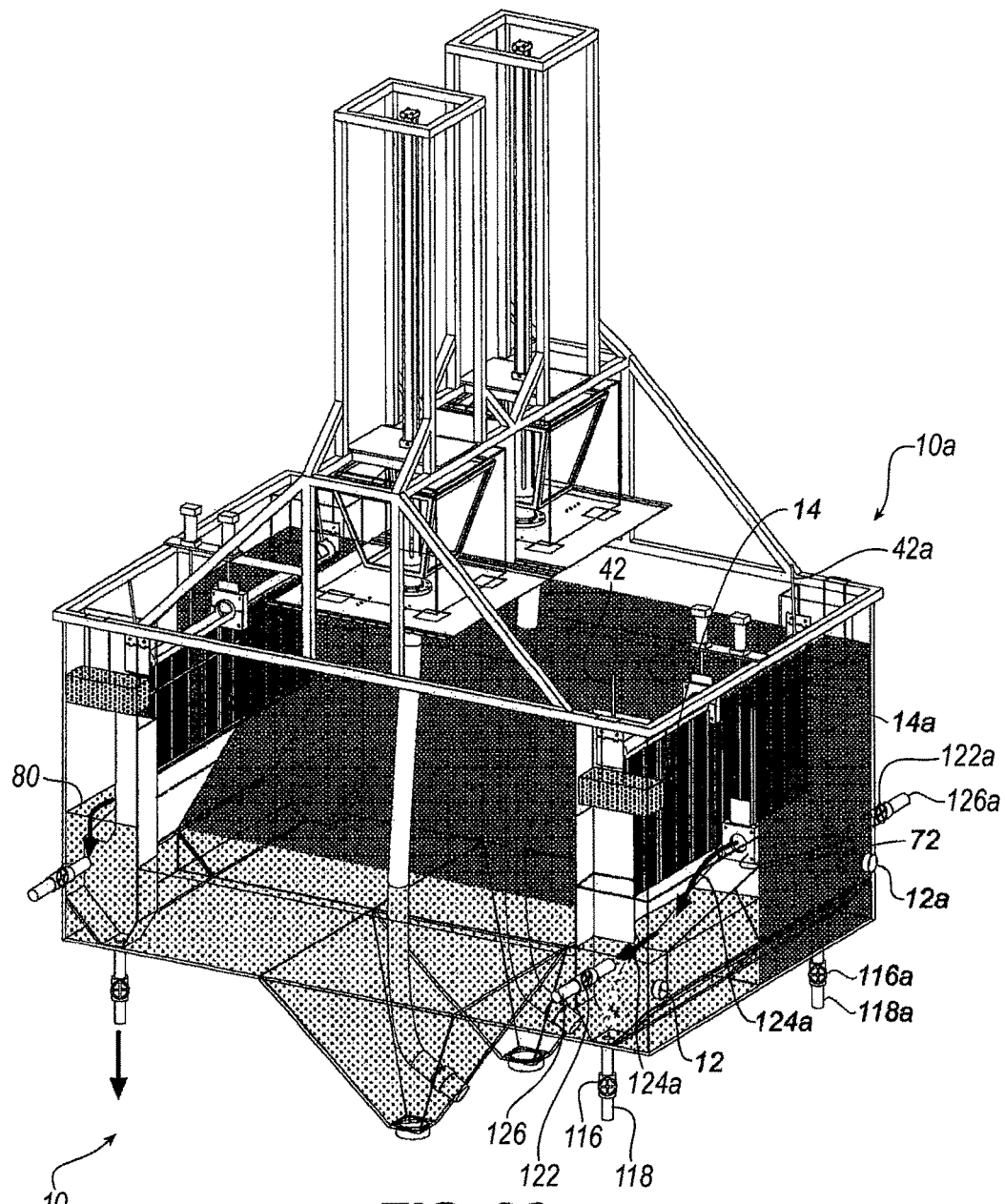
FIG. 23 is a perspective view of the embodiment shown in FIG. 3 illustrating the backwash cycle.

FIGS. 20 through 23 illustrate the bar screen backwash cycle. Referring to FIGS. 20 and 22, after the first primary settling tank 10 has filled, influent feed (via first influent pipe 12) is stopped as first inlet valve 120 is closed, and backwash valve 72 is opened. Waste water 80, flowing as represented by first arrows 124 flows through the first bar screen 14, through backwash valve 72, through second valve 122a and out through second outlet 126a. FIGS. 21 and 23 illustrate the backwash cycle for tank 10a. After tank 10a has filled, influent feed (via second influent pipe 12a) is stopped as second inlet valve 120a is closed and backwash valve 72 is opened. Waste water 80 flowing as represented by second arrows 124a flows through the second bar screen 14a, through first valve 122 and through first outlet 126.

Figure 24:
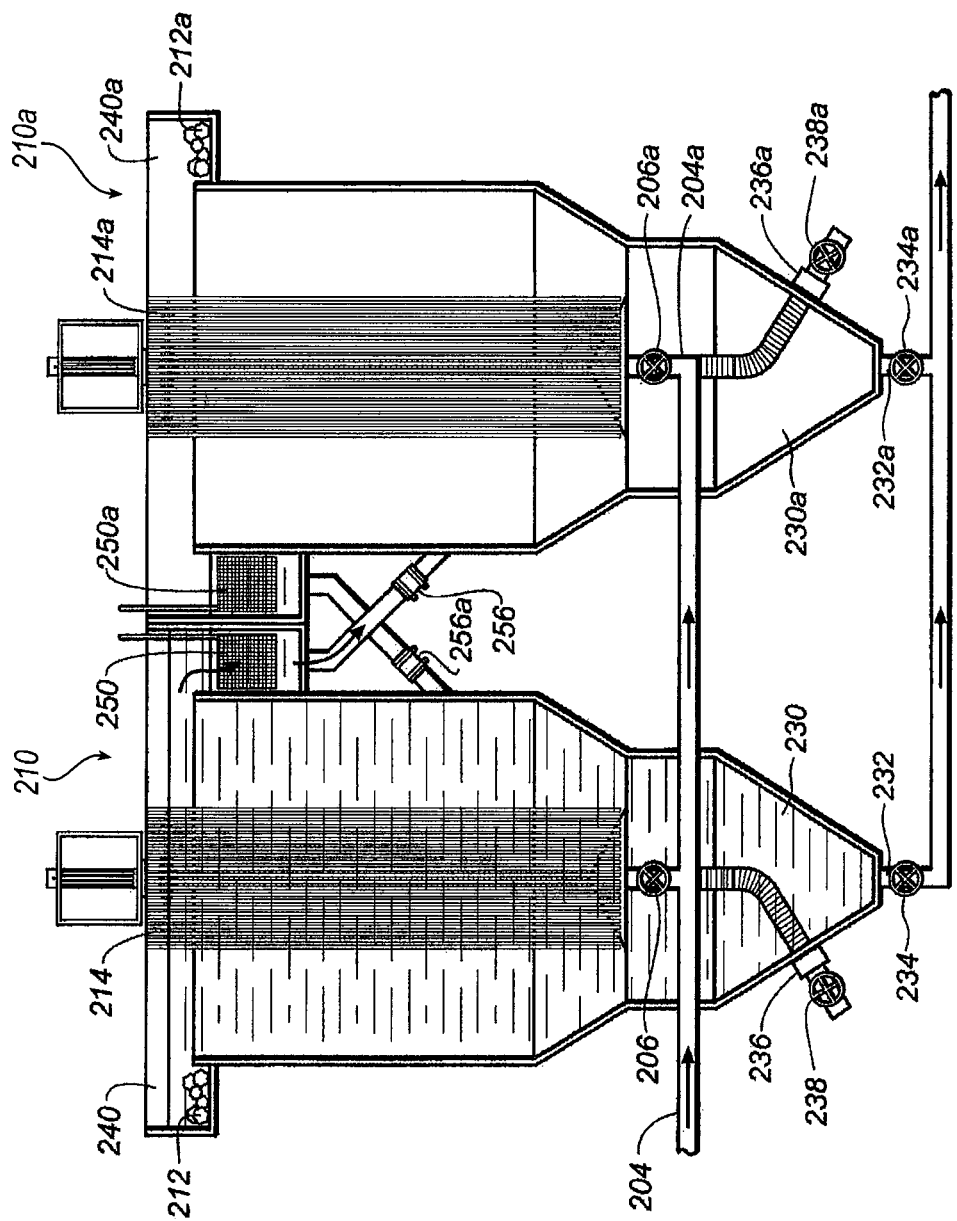
FIG. 24 is a partial-cutaway front elevation view of an alternative embodiment of the present invention.
Figure 25:
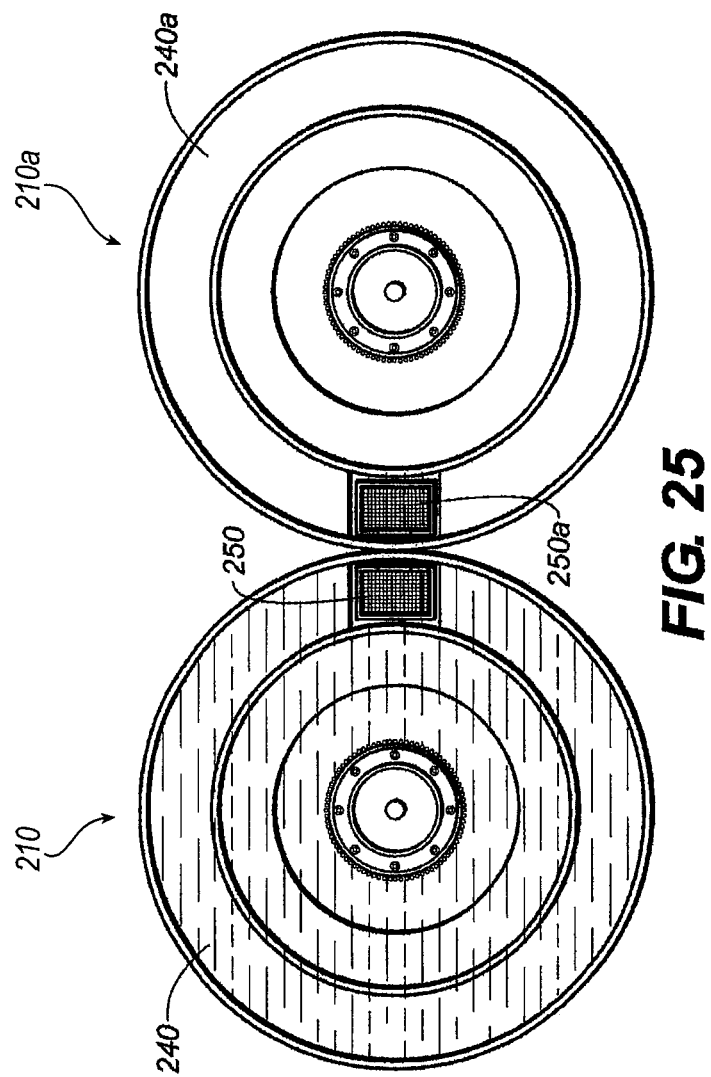
FIG. 25 is a top plan view of the embodiment shown in FIG. 24.

FIGS. 24 and 25 illustrate an alternative embodiment of the present invention. The first circular primary settling tank 210 and second circular primary settling tank 210a are circular. First scum and floatables trough 240 and second scum and floatables trough 240a surround first circular primary settling tank 210 and second circular primary settling tank 210a. First bar screen cylinder 214 and second bar screen cylinder 214a are in the center of the first circular primary settling tank 210 and second circular primary settling tank 210a. In some applications, depending on the application and solids content of the liquid this bar screen may be omitted. Waste water 80 enters first circular primary settling tank 210 through first pipe 204 and first valve 206. Similarly, waste water 80 enters second circular primary settling tank 210a through second pipe 204a and second valve 206a. First scum and floatables collection box 250 and second scum and floatables collection box 250a are in fluid communication, respectively, with first scum and floatables trough 240 and second scum and floatables trough 240a. When first valve 256 is opened, scum and floatables 212 exit first scum and floatables trough 240 and flow to first scum and floatables collection box 250. In some embodiments, a flex connection is used instead of first valve 256. The flex connection (not shown) would include a check valve on the connecting pipe to allow flow in only one direction. Similarly, when second valve 256a is opened, scum and floatables 212a exit second scum and floatables trough 240a and flow to second collection box 250a. Sludge collects in first sludge hopper 230 and second sludge hopper 230a and exits, respectively, through first pipe 232 and second pipe 232a and first valve 234 and second valve 234a. Screened waste water 80 exits first circular primary settling tank 210 and second circular primary settling tank 210a, respectively, through first drain pipe 236 and second drain pipe 236a and first valve 238 and second valve 238a.

As will be apparent to those skilled in the art in light of the foregoing disclosure, many alterations and modifications are possible in the practice of this invention without departing from the spirit or scope thereof.

What is claimed is:

1. A waste water primary treatment system for treating a waste water influent, comprising:
   a first settling compartment and a second settling compartment alternately and independently operable in parallel on a predetermined treatment cycle,
   wherein during said predetermined treatment cycle each of said first and second settling compartments is capable of carrying out the processes of grit removal, sludge removal, primary clarification, and fine screening independently of the other of said first and second settling compartments;
   wherein each of said first and second settling compartments is in limited fluidic communication with other of said settling compartments via an overflow outlet
   wherein each of said first and second settling compartments has at least one outer wall, that prevents passage of waste water influent between said first and second settling compartments during said carrying out of said processes;
   wherein each of said first and second settling compartments further includes a screen box capable of vertical movement between a low level and a high level;
   wherein each of said screen boxes includes an outlet;
   wherein each of said screen boxes includes screen material having openings of a first size;
   wherein each of said first and second settling compartments includes a bar screen having screen openings of a second size larger than said openings of the first size;
   wherein each of said first and second settling compartments includes a water inlet separated from an interior portion of said compartment by said bar screen;
   wherein each of said first and second settling compartments further includes a scum and floatables trough disposed downstream of said respective first or second bar screen; and
   wherein said first and second scum and floatables troughs are capable of being in direct fluid communication with one another via a controllable valve.

2. The waste water primary treatment system of claim 1 further comprising a scum and floatables collection container attached to said scum and floatables trough.

3. The waste water primary treatment system of claim 2 wherein said scum and floatables collection container is a form selected from the group consisting of a basket and a bag.

4. The waste water primary treatment system of claim 3 wherein said scum and floatables collection container retains said floatables and allows said waste water to pass through.

5. The waste water primary treatment system of claim 2 wherein said scum and floatables collection container is removably attached outside of at least one of said first and second settling compartments.

6. The waste water primary treatment system of claim 2 wherein said scum and floatables collection container is removably attached inside of at least one of said first and second settling compartments.

7. The waste water primary treatment system of claim 1 wherein at least one of said first and second settling compartments includes a backwash valve on the same side of said bar screen as said water inlet.

8. The waste water primary treatment system of claim 1, wherein said bar screen is disposed in an influent feed trough, a base of said bar screen being lower than a weir also disposed in said influent feed trough,
   wherein said weir has a surface that slopes downward at approximately between 60 and 70 degrees from horizontal, and wherein waste water flowing over said weir flows generally laminarly down said surface.

9. The waste water primary treatment system of claim 1 wherein at least one of said first and second settling compartments includes an influent feed basin.

10. The waste water primary treatment system of claim 1 wherein each of said scum and floatables troughs is rotatably mounted to one of said first and second settling compartments.

11. A system for treating waste water containing scum and floatables, comprising:
    a first settling compartment and a second settling compartment, each being adapted to have a waste water level that changes over time between a high level and a low level, wherein said first and second settling compartments operate alternately and independently in parallel on a predetermined treatment cycle, wherein each of said first and second settling compartments includes an inlet and a bar screen having screen openings, wherein each of said first and second settling compartments is in limited fluidic communication with other of said settling compartments via an overflow outlet; and wherein said inlet of each settling compartment is separated by said bar screen from an interior portion of said settling compartment, wherein each of said first and second settling compartments further includes respectively a scum and floatables trough disposed downstream of said respective first or second bar screen, wherein said first and second scum and floatables troughs are in direct fluid communication with one another via a valve; and wherein each of said first and second settling compartments includes respectively an outlet.

12. The system of claim 11 wherein each scum and floatables trough includes a collection container.

13. The system of claim 11 wherein at least one of said first and second settling compartments includes a backwash valve on the same side of said bar screen as said inlet.

14. The system of claim 11 wherein at least one of first and second settling compartments includes an influent feed basin.

* * * * *